US010387088B2

(12) United States Patent
Minegishi

(10) Patent No.: US 10,387,088 B2
(45) Date of Patent: Aug. 20, 2019

(54) APPARATUS, METHOD AND SYSTEM FOR DETECTING WHETHER AN MFP IS WITHIN A THRESHOLD DISTANCE

(71) Applicant: Saori Minegishi, Kanagawa (JP)

(72) Inventor: Saori Minegishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/226,994

(22) Filed: Aug. 3, 2016

(65) Prior Publication Data

US 2017/0039012 A1 Feb. 9, 2017

(30) Foreign Application Priority Data

Aug. 6, 2015 (JP) .................. 2015-156338

(51) Int. Cl.
*G06F 3/12* (2006.01)
*H04L 29/06* (2006.01)
*H04N 1/00* (2006.01)
*H04W 12/06* (2009.01)

(52) U.S. Cl.
CPC .......... *G06F 3/1238* (2013.01); *G06F 3/1222* (2013.01); *H04L 63/083* (2013.01); *H04N 1/00244* (2013.01); *H04N 1/00411* (2013.01); *H04W 12/06* (2013.01); *H04N 2201/0094* (2013.01)

(58) Field of Classification Search
CPC ..... G06F 3/1238; G06F 3/1222; G06F 3/1292
See application file for complete search history.

(56) References Cited

U.S. PATENT DOCUMENTS

| 8,830,496 B2* | 9/2014 | Itogawa ................ G06F 3/1204 |
| | | 358/1.13 |
| 10,225,435 B2* | 3/2019 | Hosoda ................ G06F 3/1203 |
| 2012/0120440 A1 | 5/2012 | Ueda |
| 2013/0086638 A1* | 4/2013 | Itogawa ................ G06F 21/34 |
| | | 726/4 |
| 2013/0231051 A1 | 9/2013 | Naruse |
| 2013/0250361 A1 | 9/2013 | Minegishi et al. |
| 2015/0067204 A1 | 3/2015 | Horie et al. |

(Continued)

FOREIGN PATENT DOCUMENTS

| JP | 2013-187568 A | 9/2013 |
| JP | 2014-109962 A | 6/2014 |

(Continued)

*Primary Examiner* — Benjamin O Dulaney
(74) *Attorney, Agent, or Firm* — Harness, Dickey & Pierce, P.L.C.

(57) ABSTRACT

To enhance the convenience of devices which can be operated through a smart device, a first information processing apparatus includes a processor, and a memory device configured to store a program. The processor executes the program to perform determining whether or not the first information processing apparatus is within a predetermined distance from a second information processing apparatus, and sending authorization information with which an authorization for an operation is requested to the second information processing apparatus, in response to determining that the first information processing apparatus is within the predetermined distance from the second information processing apparatus.

20 Claims, 15 Drawing Sheets

(56) References Cited

U.S. PATENT DOCUMENTS

| | | | |
|---|---|---|---|
| 2015/0128256 A1* | 5/2015 | Nakao | G06F 21/35 |
| | | | 726/19 |
| 2015/0138597 A1 | 5/2015 | Koshigaya | |
| 2015/0212769 A1* | 7/2015 | Norota | G06F 3/1253 |
| | | | 358/1.15 |
| 2015/0264720 A1* | 9/2015 | Hino | H04W 12/04 |
| | | | 370/315 |
| 2015/0288832 A1 | 10/2015 | Naruse | |
| 2015/0339561 A1* | 11/2015 | Takenaka | B41J 29/00 |
| | | | 358/1.14 |
| 2016/0077778 A1* | 3/2016 | Aritomi | G06F 21/35 |
| | | | 358/1.15 |
| 2016/0269384 A1* | 9/2016 | Suga | H04L 63/08 |
| 2016/0378410 A1* | 12/2016 | Inoue | G06F 3/1236 |
| | | | 358/1.15 |
| 2017/0310849 A1* | 10/2017 | Hosoda | G06F 3/1203 |

FOREIGN PATENT DOCUMENTS

| | | |
|---|---|---|
| JP | 2014-128928 | 7/2014 |
| JP | 2015-049575 A | 3/2015 |
| JP | 2015-99565 A | 5/2015 |
| JP | 2015-159533 | 9/2015 |

* cited by examiner

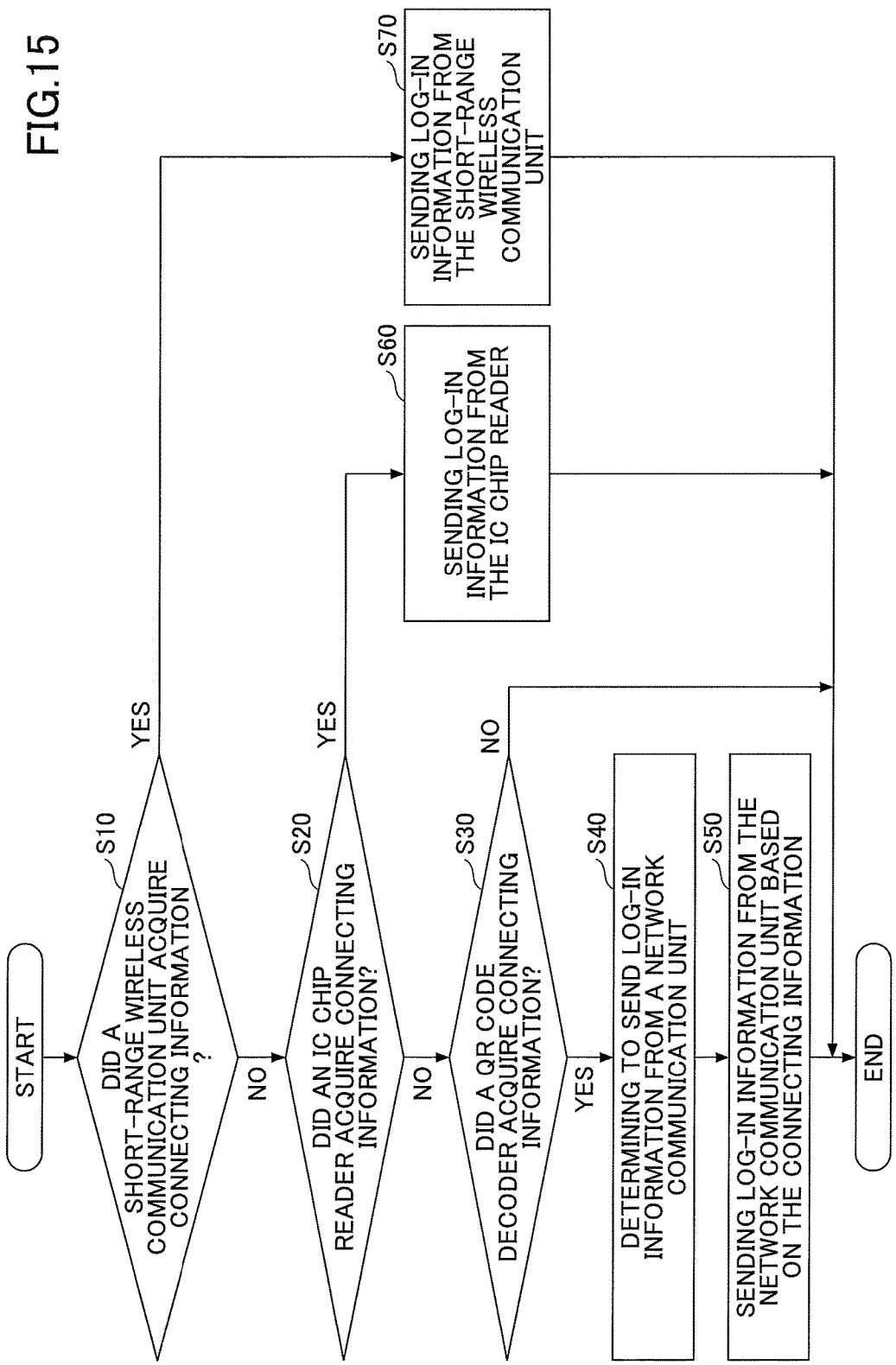

APPARATUS, METHOD AND SYSTEM FOR DETECTING WHETHER AN MFP IS WITHIN A THRESHOLD DISTANCE

CROSS-REFERENCE TO RELATED APPLICATIONS

The present application claims priority under 35 U.S.C. § 119 to Japanese Patent Application No. 2015-156338, filed Aug. 6, 2015, the contents of which are incorporated herein by reference in their entirety.

BACKGROUND OF THE INVENTION

1. Field of the Invention

The present invention relates to information processing apparatuses, information processing methods, and information processing systems.

2. Description of the Related Art

When printing documents, etc., a user operates a personal computer (PC) to request a printer, etc., for executing a job. However, along with the popularization of smart devices such as smartphones, there is an increasing demand for executing a job through a smart device with a printer when a user of the smart device is out-of-doors. It is possible to execute a job generated by use of a smart device for printing with a printer, and to have data saved on a printer or a server, etc., as is conventionally done by use of a PC, etc. Furthermore, it is also possible to operate a printer through a smart device for executing a job saved on a printer or a server, etc.

When a user executes a job using a printer, etc., the user may be required to log-in to the printer or the server, so that the printer or the server, etc., identifies the user and the job related to the user.

A technique for having a user to log-in to a printer directly has been designed (for example, see Japanese Unexamined Patent Application Publication No. 2014-128928). An information processing system disclosed in Japanese Unexamined Patent Application Publication No. 2014-128928 requests a user to read a QR Code (registered trademark) displayed on the printer with a smartphone or requests a user to use an IC card, etc., in order to make the user come close to a printer for log-in.

SUMMARY OF THE INVENTION

In view of the aforementioned problem, one aspect of the present invention provides a first information processing apparatus including a processor, and a memory device configured to store a program. The processor executes the program to perform determining whether or not the first information processing apparatus is within a predetermined distance from a second information processing apparatus, and sending authorization information with which an authorization for an operation is requested to the second information processing apparatus, in response to determining that the first information processing apparatus is within the predetermined distance from the second information processing apparatus.

BRIEF DESCRIPTION OF THE DRAWINGS

FIG. 15 is a flowchart illustrating an example of a procedure for the smart device to determine the communication method for sending the log-in information, according to the embodiment of the present invention.

DESCRIPTION OF THE EMBODIMENTS

The information processing system disclosed in Japanese Unexamined Patent Application Publication No. 2014-128928 has a problem that, even when a user sends a job from a smart device, the user has to perform a log-in operation (such as touching the printer with an IC card and entering a user identification (ID) and a password directly to the printer) to a printer, etc., for executing the job.

When printing from a desktop computer, which means that a user is not close to a printer at the time of sending printing data, it is not preferable to send log-in information along with the printing data and log-in to the printer. Instead, it is preferable that the printer requests the user to perform a log-in operation when the user comes close to the printer to print a document.

On the other hand, when printing from a smart device, which means that a user may be in front of a printer, it may be preferable that a document is printed right away after sending printing data. Unfortunately, there is a problem that, even in such a situation, a user inconveniently has to perform a log-in operation, in addition to a printing operation through a smart device.

The object of the present invention is to enhance convenience of devices which can be operated through a smart device, in view of the aforementioned problem.

In the following, embodiments of the invention will be described with reference to the drawings.

First Embodiment

Figure 1A:
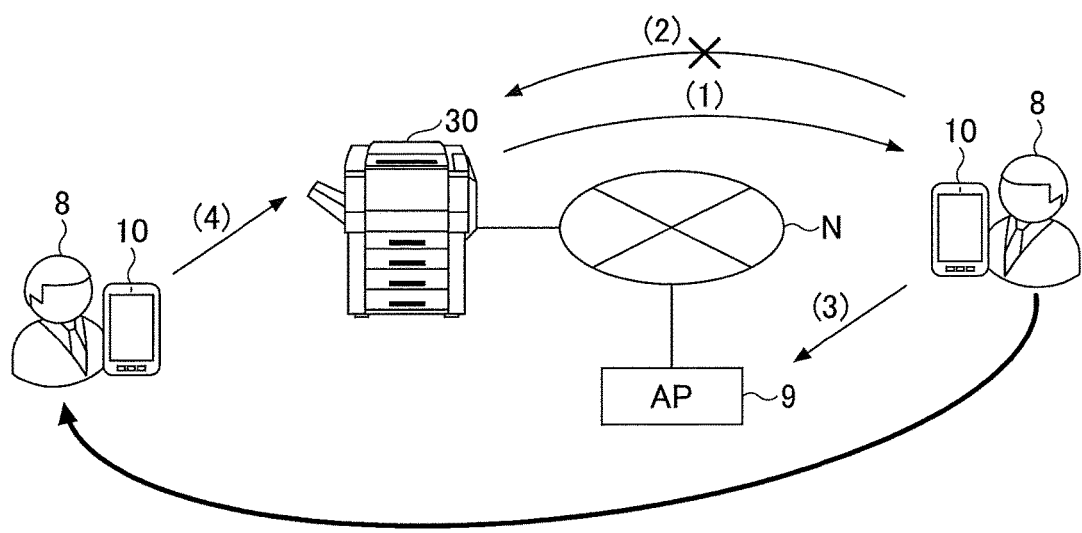
FIGS. 1A and 1B are drawings illustrating examples of log-in operations when a user operates a smart device to request a multi-functional peripheral (MFP) to execute a job, according to an embodiment of the present invention.
Figure 1B:
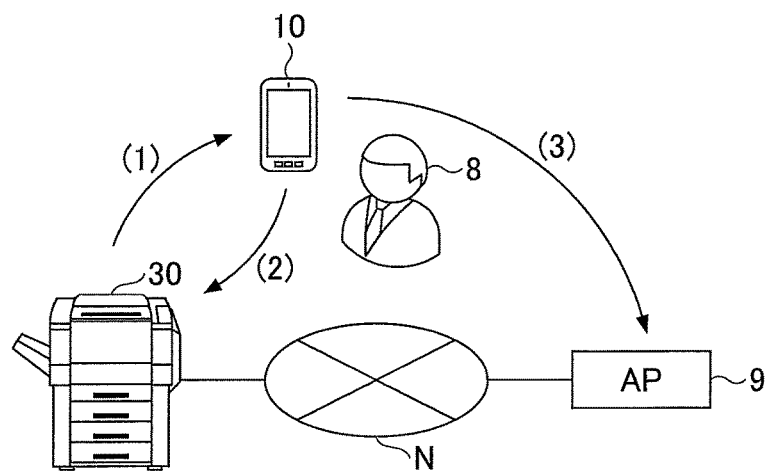

FIGS. 1A and 1B are drawings illustrating examples of log-in operations when a user operates a smart device 10 to request an MFP 30 to execute a job, according to the first embodiment of the present invention.

First, with reference to FIG. 1A, a description will be given of a case where the distance between the user having the smart device 10 and the MFP 30 is far.

(1) The smart device 10 obtains connecting information (which is an example of the first information) through a wireless communication with the MFP 30, so as to connect to the MFP 30 using a network N. Here, an example of the wireless communication is Bluetooth Low Energy (BLE) (registered trademark) ("registered trademark" is omitted hereinafter), etc.

(2) The smart device 10 detects that the distance between the user having the smart device 10 and the MFP 30 is far, based on the radio field intensity. In this case, the smart device 10 does not send log-in information to the MFP 30.

(3) The smart device 10 connects to the MFP 30 through an access point (AP) 9 by use of the connecting information, so as to send a print job (which is an example of the second information). In this way, the print job is saved on the MFP 30.

(4) When the user comes close to the MFP 30, the user enters the log-in information or touches the MFP 30 with an integrated circuit (IC) card, so as to log-in to the MFP 30. In this way, the user can execute the print job saved on the MFP 30.

Next, with reference to FIG. 1B, a description will be given of a case where the distance between the user having the smart device 10 and the MFP 30 is close.

(1) The smart device 10 obtains connecting information through the wireless communication with the MFP 30, so as to connect to the MFP 30 through the network N.

(2) The smart device 10 detects that the distance between the user having the smart device 10 and the MFP 30 is close, based on the radio field intensity. As the user is close to the MFP 30, the smart device 10 sends log-in information to the MFP 30.

(3) The smart device 10 connects to the MFP 30 through the AP 9 by use of the connecting information, so as to execute a print job. In this way, the print job is saved on the MFP 30. In this case, the user can execute the print job saved on the MFP 30 without performing a log-in operation to the MFP 30.

As described, the smart device 10 according to the first embodiment sends log-in information to the MFP 30 when the smart device 10 is close to the MFP 30, so that the user need not perform a log-in operation, which is more convenient for the user.

In a conventional configuration, a smart device may be arranged to send log-in information (or a user ID and a password) at the time of sending a print job to an MFP. However, as such a smart device has difficulty determining whether or not the user is close to the MFP, an alternative arrangement is preferable in which the user enters keys (or a user ID and a password) or uses an IC card as a log-in operation at the time of executing the print job.

Terms

Here are explanations of the terms used in the first embodiment. The smart device 10 is carried by the user, which means that, when the user is close to the MFP 30, the smart device 10 is close to the MFP 30 as well. Without differentiating the user and the smart device 10, an expression "a user is close to the MFP 30" is used in the first embodiment.

Furthermore, an expression "a user is close to the MFP 30" means that the user and the MFP 30 are within such a distance that, for example, the user can reach for the MFP 30 for an operation or the user can operate the MFP 30 by moving a little.

The log-in information is authorization information for requesting an authorization for the user to operate the MFP 30. The log-in information is not limited to a user ID and a password or information stored in an IC card.

<Example of System Configuration>

Figure 2:
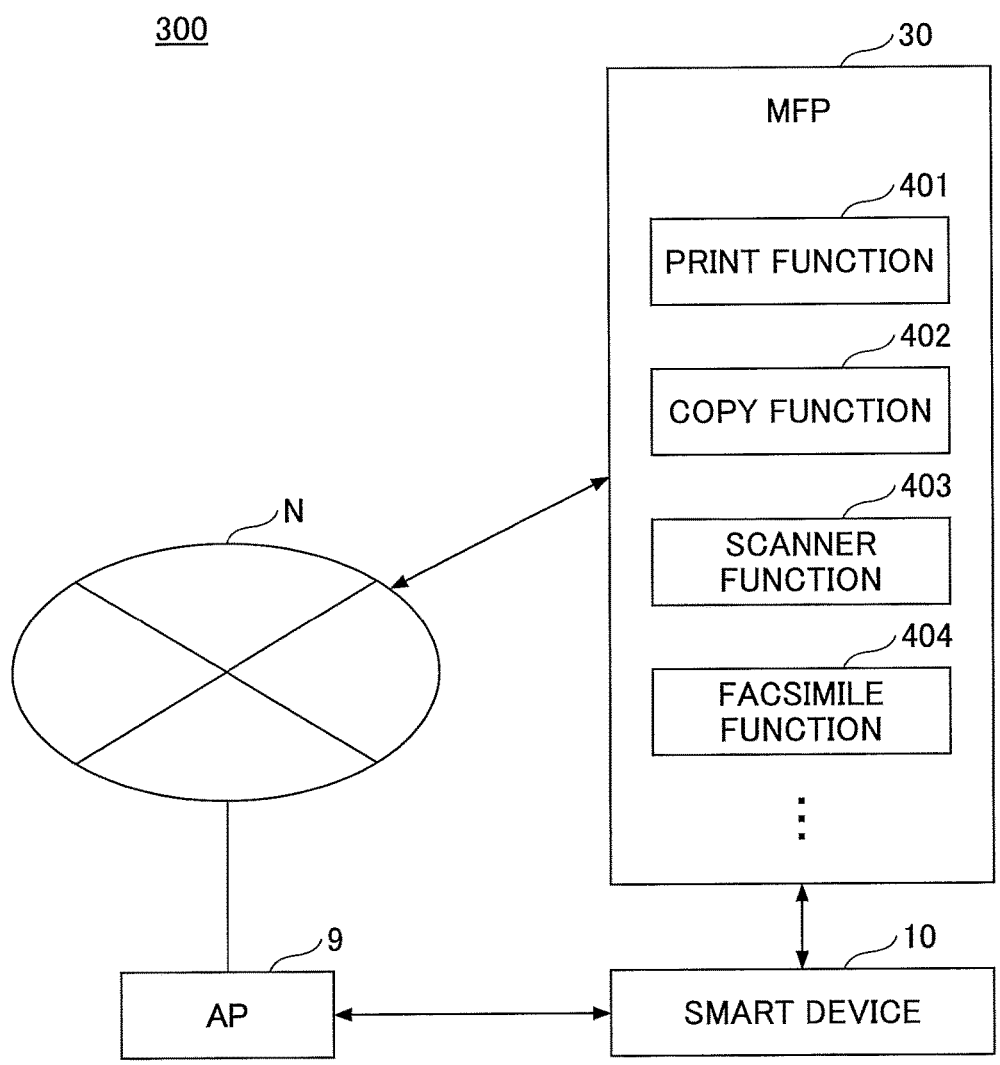
FIG. 2 is a drawing illustrating an example of a schematic configuration of an information processing system, according to the embodiment of the present invention.

FIG. 2 is a drawing illustrating an example of a schematic configuration of an information processing system 300, according to the first embodiment of the present invention. The information processing system 300 includes the MFP 30 and the smart device 10 which are connectable to the network N.

The MFP 30 has multiple functions such as a print function 401, a copy function 402, a scanner function 403, a facsimile function 404 in a single body. The MFP 30 utilizes the print function 401, so as to form an image on a printing medium, such as a sheet of paper, based on image data provided externally or image data obtained by the scanner function 403 through scanning a manuscript.

In addition to the MFP 30, the smart device 10 also connects to, for example, an electronic blackboard, a teleconferencing device, a digital camera, a game machine, a PC, a smartphone, a handheld printer, a tablet device, and a television. A user logs-in to such devices in order to utilize functions of saving and displaying data. However, according to the first embodiment, the user need not perform a log-in operation, which means that the convenience of such devices is enhanced.

The smart device 10 is a handy portable information processing terminal device provided with multiple information acquiring units 405. The smart device 10 may be, for example, a smartphone provided with a call function (or a multifunctional telephone) or a tablet computer focusing on information processing. Moreover, the smart device 10 may be, but is not limited to, a wearable device (such as a head-up display and a wristwatch device), a mobile phone, a personal digital assistant (PDA), a laptop, and a digital camera.

The MFP 30 is connected to the network N through, for example, a local area network (LAN) with or without wires for network communication. Furthermore, the smart device 10 is connected to the network N through wireless communications such as a wireless LAN. The following description is provided, assuming that the network N employs an internet protocol (IP) as at least a part of the communication protocol. However, the network N need not employ an IP. The network N may be a telephone network as well.

The information acquiring unit 405 of the smart device 10 may employ a QR Code, a near field communication (NFC), or a short-range wireless communication. The smart device 10 captures the image of a QR Code using a camera and decodes the QR Code to obtain the connecting information as described above. Further, the smart device 10 reads an NFC tag to obtain the connecting information. Further, the smart device 10 communicates with the MFP 30 through a short-range wireless communication to obtain the connecting information. The following description exemplifies a case where BLE is employed as a short-range wireless communication in the first embodiment, although a Bluetooth (registered trademark) other than BLE, ZigBee (registered trademark), an infrared communication, Z-Wave, ANT, and a wireless LAN may be employed as a short-range wireless communication.

The smart device 10 performs communication with the MFP 30 through the network N by use of the connecting information obtained from the MFP 30. The smart device 10 can send an instruction for performing each of the functions such as a print job to the MFP 30. Moreover, the smart device 10 can utilize each of the functions of the MFP 30 through communication with the MFP 30.

<Hardware Configuration>
<<Smart Device>>

Figure 3:
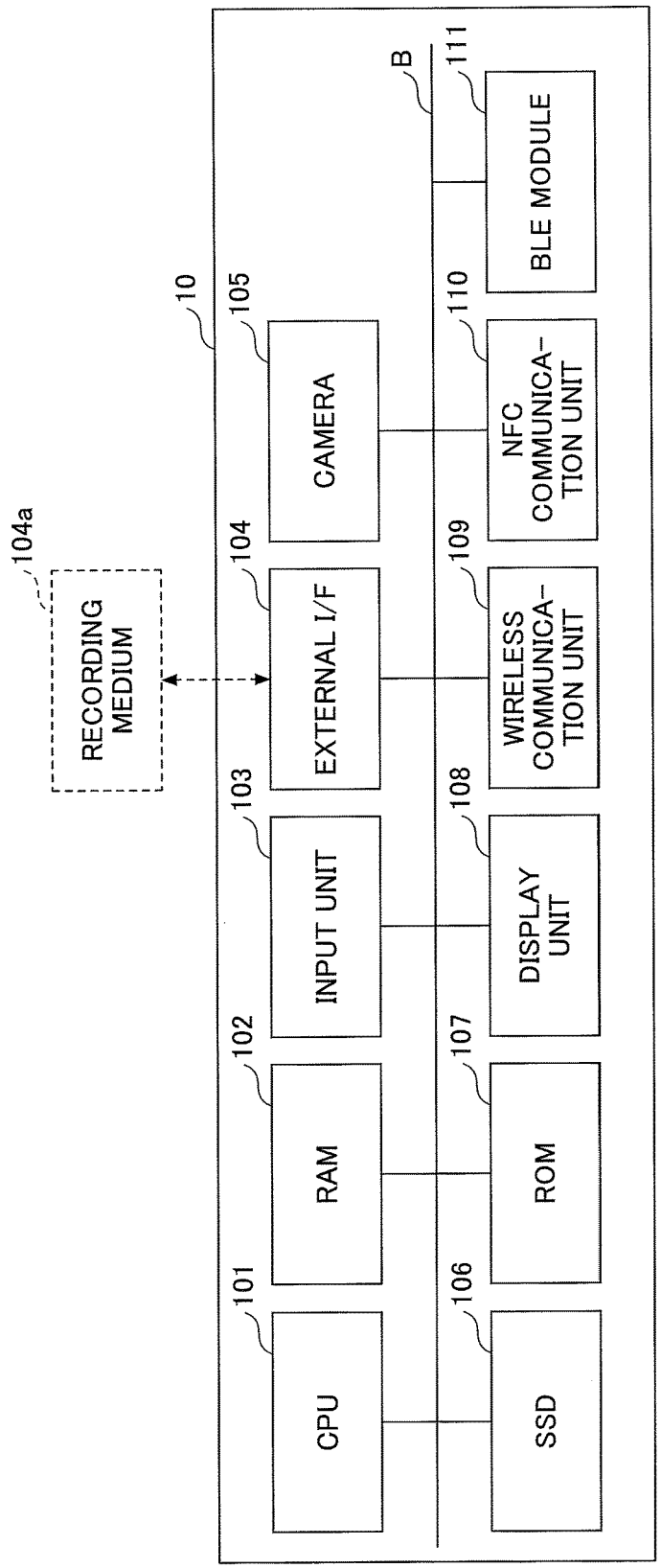
FIG. 3 is a drawing illustrating an example of a hardware configuration of the smart device, according to the embodiment of the present invention.

FIG. 3 is a drawing illustrating an example of a hardware configuration of the smart device 10, according to the first embodiment of the present invention. As illustrated in the drawing, the smart device 10 functions as an information processing apparatus (referred to as the first information processing apparatus). The smart device 10 includes a central processing unit (CPU) 101, a random access memory (RAM) 102, an input unit 103, an external interface (I/F) 104, a camera 105, and a solid state drive (SSD) 106, a read-only memory (ROM) 107, a display unit 108, a wireless communication unit 109, a NFC communication unit 110, and a BLE module 111, which are mutually connected through a bus B.

The CPU 101 is a processor that retrieves programs and data from memory devices such as the ROM 107 and the SSD 106 onto the RAM 102 and then performs processing, so as to control the entire smart device 10 and execute the functions.

The RAM 102 is a volatile semiconductor memory (a memory device) which temporarily stores programs and data.

The input unit 103, such as a keyboard and a touch panel, is used for entering each of operation signals to the smart device 10. Furthermore, the input unit 103 may further include a mouse pointer and an audio-input device.

The external I/F 104 is an interface for external devices such as a recording medium 104a. The recording medium 104a is capable of storing applications for executing the functions according to the first embodiment. The smart device 10 can perform read/write operations on the recording medium 104a through the external I/F 104.

Examples of the recording medium 104a are a secure digital (SD) memory card, a universal serial bus (USB) memory, a digital versatile disk (DVD), a compact disk (CD), a flexible disk, etc.

The camera 105 is an image-capturing device provided with a lens for forming an image, a diaphragm, and an image-capturing device such as a complementary metal-oxide semiconductor (CMOS) and a charge-coupled device (CCD).

The SSD 106 is a non-volatile memory device which stores programs and data. Examples of stored programs and data are an operating system (OS), which is the basic software for controlling the entire smart device 10, and applications for providing various functions, which are operated on an OS. Further, the smart device 10 may include a hard disk drive (HDD) instead of or in addition to the SSD 106.

The ROM 107 is a non-volatile semiconductor memory (a memory device) which is capable of maintaining programs and data even after the power is turned off. The ROM 107 stores programs and data such as a basic input/output system (BIOS), which is executed when the smart device 10 is booted, an OS setting, and a networking setting.

The display unit 108 such as a liquid crystal display (LCD) displays processing results of the smart device 10. The display device 108 is provided with a touch panel.

The wireless communication unit 109 is an interface for performing wireless communication, so as to connect to the MFP 30 in accordance with a communication standard such as a wireless LAN. Here, the smart device 10 may connect to the MFP 30 in accordance with communication standards of a wireless LAN that is not mediated by the AP 9, such as Wi-Fi, Direct, and an ad hoc mode. Furthermore, the wireless communication unit 109 may be an interface for connecting to the cellular network such as Long Term Evolution (LTE)

The NFC communication unit 110 performs communication in accordance with communication standards using IC chips of NFC, TransferJet (registered trademark), etc. In other words, the NFC communication unit 110 is a reader/writer of a radio-frequency (RF) tag.

The BLE module 111 is a communication unit which performs communication in accordance with the communication standard of BLE.

Figure 4:
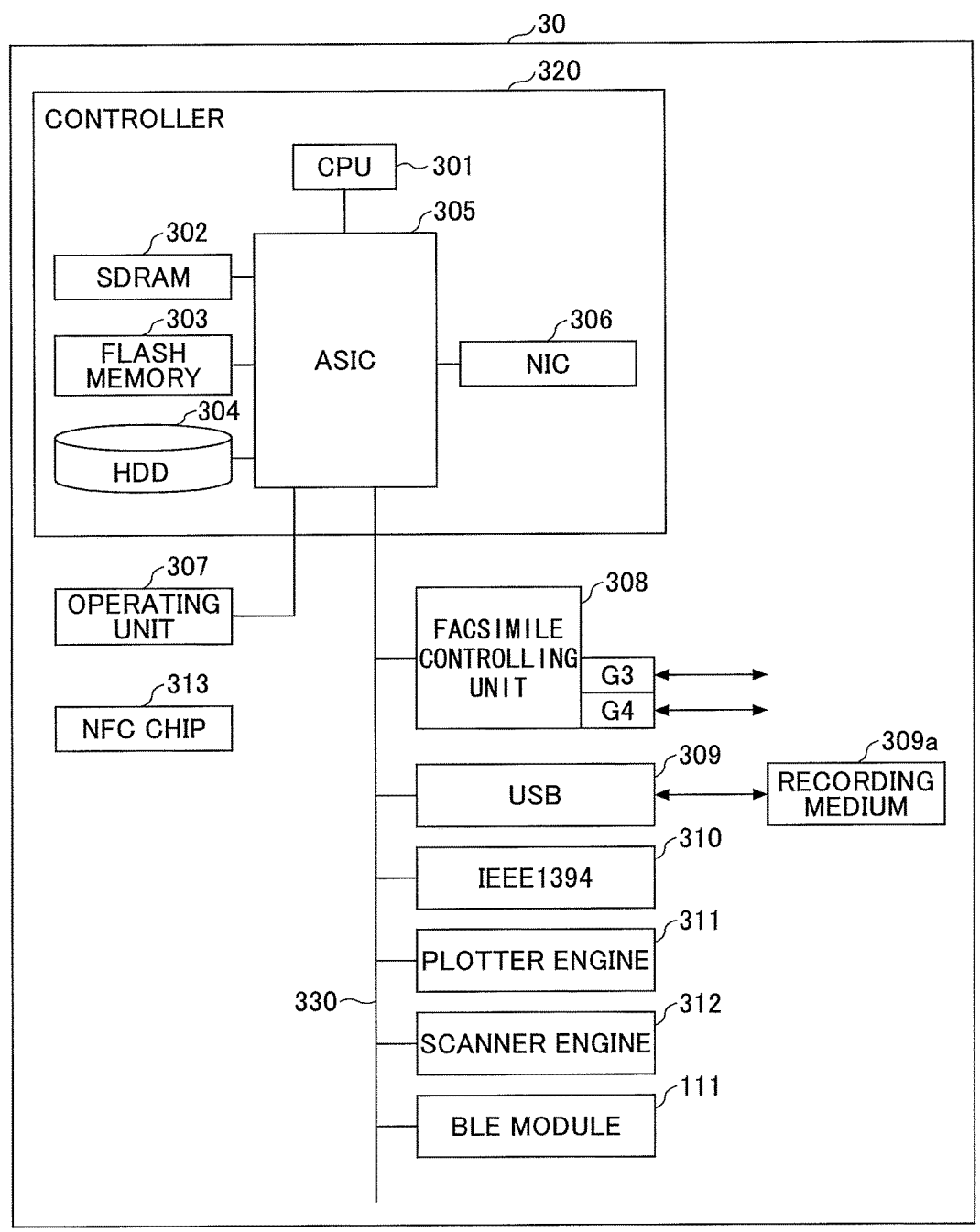
FIG. 4 is a drawing illustrating an example of a hardware configuration of the MFP, according to the embodiment of the present invention.

FIG. 4 is a drawing illustrating an example of a hardware configuration of the MFP 30, according to the first embodiment of the present invention. The MFP 30 also functions as an information processing apparatus (referred to as the second information processing apparatus). The MFP 30 is provided with a controller 320. The controller 320 includes a CPU 301, an application specific integrated circuit (ASIC) 305, a synchronous dynamic random access memory (SDRAM) 302, a flash memory 303, a HDD 304, and a network interface card (NIC) 306.

The ASIC 305 is a multifunctional device board provided with a CPU interface, an SDRAM interface, a local bus interface, a protocol control information (PCI) bus interface, a media access controller (MAC), a HDD interface, etc.

The CPU 301 reads out various programs (such as a usage management program) from the HDD 304 through the ASIC 305 for execution.

The SDRAM 302 serves as a program memory for storing various programs or a work memory for the CPU 301 to execute various programs, etc. Further, a dynamic random access memory (DRAM) and a static random access memory (SRAM) may be employed as a substitute for the SDRAM 302.

The flash memory 303 is a non-volatile memory which stores a boot loader (or a boot program) and an OS for booting the MFP 30. Further, the flash memory 303 serves as an application memory for storing various programs, a service memory for storing software for various services (such as a copy service, a print service, and a facsimile service), a firm memory for storing firmware, a data memory for storing a network address and model information including a serial number, etc.

Further, as a substitute for the flash memory 303, another non-volatile memory such as a non-volatile RAM having a backup circuit supported by a RAM and a battery as well as an electrically erasable programmable read-only memory (EEPROM) may be employed.

The HDD 304 is a non-volatile recording medium which stores data regardless of on/off states of the power of the MFP 30. The HDD 304 stores programs and data other than the programs and data stored in the flash memory 303. Further, the HDD 304 may be used as a firm memory.

The NIC 306 is an interface for performing communication with the smart device 10 through the network N (such as an Ethernet (registered trademark) card).

The controller 320 has an operating unit 307 connected thereto. The operating unit 307 includes various operation keys, a text display of a LCD or a cathode-ray tube (CRT) as a display unit, and a touch panel, which are used when a user enter a variety of instructions to the MFP 30.

Furthermore, a facsimile controlling unit 308, an USB 309 where a recording medium 309a can be connected and disconnected, an Institute of Electrical and Electronics Engineers (IEEE) 1394 (310), a plotter engine 311, a scanner engine 312, and the BLE module 111, are connected to the controller 320 through the PCI bus 330, so as to provide each of the services such as the copy service, the print service, and the facsimile service. The plotter engine 311 may employ either of an electrophotographic system or an inkjet system.

Further, as the illustrated configuration is just an example, the hardware configuration of the MFP 30 is not limited to the configuration illustrated in FIG. 4. For example, the NIC 306 may be connected to the PCI bus 330. Furthermore, the NIC 306 may be connected the network N with a wire, or wirelessly through a wireless LAN.

Moreover, instead of or in addition to the NIC 306, a digital service unit (DSU) or a modem for connecting to a telephone network may be provided. A connecting unit for connecting to a cellular network may also be provided.

An NFC chip 313 is a RF tag, which includes a connecting function and a memory. The NFC chip preliminarily stores connecting information. The NFC chip 313 is an external device which is not connected to the PCI bus 330 (and may also be connected to the PCI bus 330) and, for example, is attached to the body of the MFP 30. The NFC chip 313 may be attached to anywhere on the MFP 30, as long as being connectable with the smart device 10.

<Functions>

Figure 5:
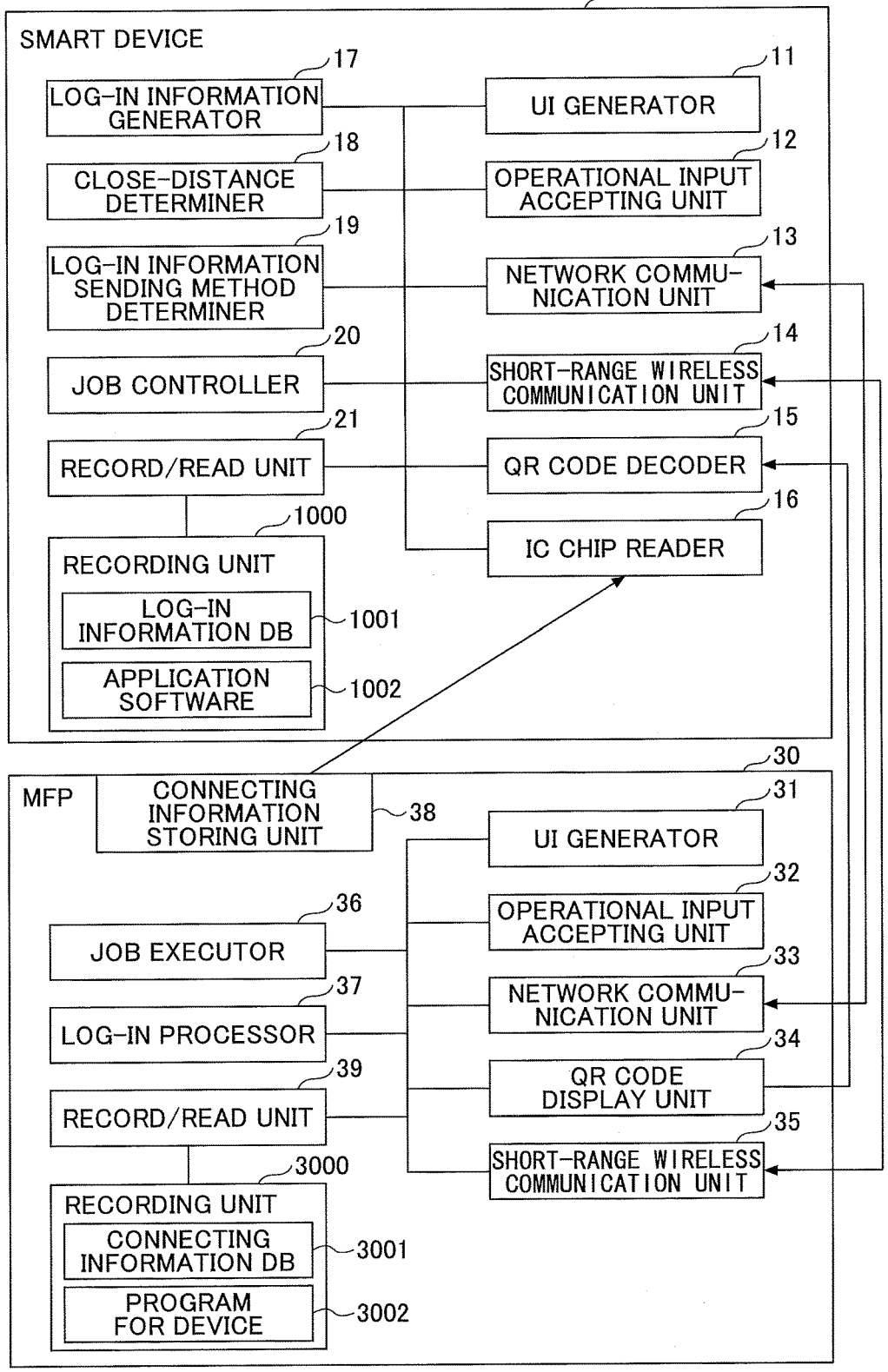
FIG. 5 is a functional block diagram illustrating an example of the information processing system, according to the embodiment of the present invention.

FIG. 5 is a functional block diagram illustrating an example of the information processing system 300, according to the first embodiment of the present invention. In the following, functions of the MFP 30 and the smart device 10 will be described.

<<MFP>>

The MFP 30 includes a user interface (UI) generator 31, an operational input accepting unit 32, a network communication unit 33, a QR Code display unit 34, a short-range wireless communication unit 35, a job executor 36, a log-in processor 37, and a record/read unit 39. The CPU 301 operates each of constructional elements illustrated in FIG. 4 based on a program 3002 for device stored in the HDD 304, the flash memory 303, or the SDRAM 302, so that each of the units mentioned above provides a function or a method. Further, the MFP 30 includes a connecting information storing unit 38.

Furthermore, the MFP 30 includes a recording unit 3000 which consists of at least one of the HDD 304, the flash memory 303, and the SDRAM 302, illustrated in FIG. 4. The recording unit 3000 stores connecting information data base (DB) 3001 and programs 3002 for devices. The programs 3002 for devices may be distributed through the recording medium 309a or delivered through downloading from a server.

The connecting information DB 3001 stored in the recording unit 3000 will be explained.

TABLE 1

| DEVICE ID | MFP-01 (MODEL ID + NUMBER) | | |
|---|---|---|---|
| CONNECTING INFORMATION | AP INFORMATION | SSID | AAAAAAAA |
| | | ENCRYPTION METHOD | WEP |
| | | PASSWORD | XXXXXXXX |
| | NETWORK INFORMATION | IP ADDRESS | 192.168.1.1 |
| | | HTTP PORT NUMBER | 53080 |
| | | HTTPS PORT NUMBER | 530443 |

(Connecting Information DB)

In the recording unit 3000, the connecting information DB 3001, which stores such a connecting information table as illustrated in table 1, is constituted. The connecting information table includes items of "DEVICE ID" and "CONNECTING INFORMATION". In the explanation of the first embodiment, "DEVICE ID" and "CONNECTING INFORMATION" are simply referred to as connecting information. DEVICE ID: the device ID is identification information for identifying the MFP 30. For example, even in a case where multiple MFPs 30 are located near the smart device 10, the smart device 10 can identify the MFP 30 to be connected with. Instead of or in addition to the device ID, the name of the MFP 30 may be registered. Furthermore, the device ID is configured in such a way as "MODEL ID+NUMBER", so that the model ID indicates that the smart device 10 is communicating with a MFP 30. Further, models other than the MFP 30 may be, but is not limited to, a projector, a printer, an electronic blackboard, etc. CONNECTING INFORMATION: connecting information is information for the smart device 10 to connect to the MFP 30. Connecting information includes "AP INFORMATION" and "NETWORK INFORMATION". The network information includes, for example, the IP address and the port number used for the MFP 30. AP information is information for the smart device 10, etc., to connect to the AP 9. In a case where the smart device 10 connects to the MFP 30 in the company that the user belongs to, AP information may be preset on the smart device 10, so that the AP information is not needed. However, for the MFP 30 at a place where the user stops by (such as on a business trip, at another business facility, and at a public facility), AP information is needed. Further, at least the password of the AP information is preferred to be encrypted. In such a case, an application acquires a cryptography key through a user authentication of an authentication server, in order to decode the password.

(Functions of MFP)

The UI generator 31 consists of the CPU 301, the operating unit 307, etc., as illustrated in FIG. 4, and displays a graphical user interface (GUI) on the operating unit 307.

The operational input accepting unit 32 consists of the CPU 301, the operating unit 307, etc., as illustrated in FIG. 4, and accepts operations from the user. The operational input accepting unit 32 accepts operations through a hard key of the operating unit 307 or a soft key displayed on the GUI.

The network communication unit 33 consists of the CPU 301, the NIC 306, etc., as illustrated in FIG. 4, and communicates with the smart device 10 having connecting information through the network N.

The QR Code display unit 34 consists of the CPU 301, the operating unit 307, etc., as illustrated in FIG. 4, and displays a QR Code on the operating unit 307. That is to say, connecting information stored in the connecting information DB 3001 of the recording unit 3000 is converted into a QR Code to be displayed on the operating unit 307.

The short-range wireless communication unit 35 consists of the CPU 301, the BLE module 111, etc., as illustrated in FIG. 4, and communicates with the smart device 10 in accordance with the communication standard of BLE.

The job executor 36 consists of the CPU 301, the ASIC 305, the plotter engine 311, the facsimile controlling unit 308, the scanner engine 312, etc., as illustrated in FIG. 4, and executes a print job requested from the smart device 10.

The log-in processor 37 consists of the CPU 301, etc., as illustrated in FIG. 4, and determines whether or not to authorize a log-in of the user, based on log-in information received from the smart device 10. The determination of an authorization for log-in is made, for example, based on whether or not a pair of a user ID and a password is preliminary registered, or maybe whether or not a personal identification number (PIN) code, which is later described, corresponds to a user ID and a password. When authorized, a log-in state is maintained to accept operations by the user. When the user logs out, or after a predetermined amount of time passes, the log-in state is cancelled.

The record/read unit 39 consists of the HDD 304, the flash memory 303, the SDRAM 302, etc., as illustrated in FIG. 4, and performs processing for recording various kinds of data on the recording unit 3000 and for reading out the various kinds of data recorded in the recording unit 3000.

The connecting information storing unit 38 provided in the MFP 30 consists of the NFC chip 313 as illustrated in FIG. 4, which stores connecting information in the internal memory of the NFC chip 313. The connecting information in the connecting information storing unit 38 is the same as in the connecting information DB 3001 but is stored separately from the connecting information DB 3001. The connecting information in the connecting information storing unit 38 is stored by a person involved in developing the MFP 30 and relevant applications, etc. In a case where the MFP 30 has a function to rewrite the stored contents of the connecting information storing unit 38, the MFP 30 is capable of rewriting the connecting information on the connecting information storing unit 38 according to the connecting information stored in the connecting information DB 3001.

<<Smart Device>>

The smart device 10 includes a UI generator 11, an operational input accepting unit 12, a network communication unit 13, a short-range wireless communication unit 14, a QR Code decoder 15, an IC chip reader 16, a log-in information generator 17, a close-distance determiner 18, a log-in information sending method determiner 19, a job controller 20, and a record/read unit 21. The CPU 101 operates each of the constructional elements illustrated in FIG. 3 based on an application stored in the SSD 106, the ROM 107, or the RAM 102, so that each of the functional units mentioned above provides a function or a method.

Furthermore, the smart device 10 includes a recording unit 1000 which consists of at least one of the SSD 106, the ROM 107, and the RAM 102, illustrated in FIG. 3. The recording unit 1000 stores a log-in information DB 1001 and applications (or application software 1002). The applications are distributed through the recording medium 104a, or delivered through downloading from a server.

The log-in information DB 1001 stored in the recording unit 1000 will be explained.

TABLE 2

| DEVICE ID | LOG-IN FORMAT |
|---|---|
| MFP | USER ID + PASSWORD |
| PRINTER | PIN CODE |
| PROJECTOR | SMART DEVICE ID |
| WHITEBOARD | USER ID + PASSWORD |

(Log-in Information)

In the recording unit 1000, the log-in information DB 1001, which stores such a log-in information table as illustrated in table 2, is constituted. In the log-in information DB 1001, "LOG-IN FORMAT" is preset so as to correspond to "MODEL ID". For example, the log-in format for the model ID "MFP" is registered to be "USER ID+PASSWORD". Moreover, biometric authentication information may be registered as log-in information.

Similarly, log-in formats are preset so as to respectively correspond to each of "PRINTER", "PROJECTOR", and "WHITEBOARD" as described in table 2. Referring to the log-in formats, the log-in information generator 17, as described later, generates appropriate log-in information in accordance with each model (which is a MFP in the first embodiment).

Further, corresponding to each model, log-in information itself may be stored the log-in information DB 1001, such as "suzukijiro (user ID), ABCDEFG (password)" corresponding to "MFP". In this case, the log-in information is preferably encrypted so as to be accessible only by the user.

(Functions of Smart Device)

The UI generator 11 consists of the CPU 101, the display unit 108, etc., as illustrated in FIG. 3, and displays a GUI on the display unit 108.

The operational input accepting unit 12 consists of the CPU 101, the display unit 108, the input unit 103, etc., as illustrated in FIG. 3, and accepts operations from the user. That is to say, the operational input accepting unit 32 accepts inputs through a hard key and a soft key.

The network communication unit 13 consists of the CPU 101, the wireless communication unit 109, etc., as illustrated in FIG. 3, and communicates with the MFP 30 through the network N. Specifically, the network communication unit 13 communicates with the MFP 30 by use of either one of the connecting information obtained by the short-range wireless communication unit 14, connecting information obtained by the QR Code decoder 15, or connecting information obtained by the IC chip reader 16, so as to send a print job. Here, in a case where the user knows the connecting information, the connecting information may be preliminary stored by the user on the smart device 10.

The short-range wireless communication unit 14 consists of the CPU 101, the BLE module 111, etc., as illustrated in FIG. 3, and communicates with the smart device 10 in accordance with the communication standard of BLE. The short-range wireless communication unit 14 receives, form the MFP 30, connecting information stored in the recording unit 3000 of the MFP30.

Here, the short-range wireless communication unit 14 is capable of communicating within a distance of more than ten meter. In the first embodiment, the short-range wireless communication unit 14 communicates with MFP 30 only when the distance from the MFP 30 is adequately close, such as within approximately a few decade centimeters to a meter, or when the radio field intensity is beyond the threshold value. In this way, it is determined that the smart device 10 is located near the MFP 30. Further, the radio field intensity of the short-range wireless communication unit 35 of the MFP 30 may be set to be weaker, so as to be connected only with even closer smart devices 10.

In the meantime, as the short-range wireless communication unit 14 is capable of communicating with the MFP 30 even at some distance from the MFP 30, the short-range wireless communication unit 14 may receive connecting information regardless of the radio field intensity. In this case, the comparison result of reception intensity and a threshold value is maintained. However, when connecting information is sent to a long distance from an MFP 30 which is operable without authentication, the MFP 30 can be operated from a distance, which may cause, for example, image data scanned by a user to be taken by another user. Therefore, it may be preferable that the distance for receiving connecting information is limited to the vicinity of the MFP 30. Here, whether or not to receive connecting information may be determined according to the needs.

The QR Code decoder 15 consists of the CPU 101, the camera 105, etc., as illustrated in FIG. 3, and decodes the QR Code displayed on the operating unit 307 of the MFP 30, so as to obtain connecting information.

The IC chip reader 16 consists of the CPU 101, the NFC communication unit 110, etc., as illustrated in FIG. 3, and reads out connecting information from the NFC chip 313 attached to the MFP 30.

The log-in information generator 17 consists of the CPU 101, etc., as illustrated in FIG. 3, and confirms the model ID of connecting information, so as to read out a log-in format corresponding to the model ID from the log-in information DB 1001. Then, the log-in information generator 17 generates log-in information based on the log-in format. Information needed for generating log-in information, such as a user ID, a password, a PIN code, and an ID of a smart device 10, is stored in the recording unit 1000. The mentioned information is preferably encrypted, but may be decoded responding to a user log-in to the smart device 10 or to a relevant application. Here, a PIN code is a set of numbers unique to a user, which is associated with the user in the MFP 30. Similarly, an ID of a smart device 10 is identification information unique to a smart device 10, which is associated with the user in the MFP 30. In this way, the MFP 30 can identify users.

The close-distance determiner 18 consists of the CPU 101, etc., as illustrated in FIG. 3, and determines whether or not the smart device 10 is in the predetermined range of distance from the MFP 30. In the first embodiment, the smart device 10 is determined to be close to the MFP 30 when either one of the short-range wireless communication unit 14, the QR Code decoder 15, or the IC chip reader 16 obtains connecting information. Here, the short-range wireless communication unit 14 obtains connecting information when the radio field intensity is beyond a threshold value.

The log-in information sending method determiner 19 consists of the CPU 101, etc., as illustrated in FIG. 3, and determines communication methods for sending log-in information to the MFP 30, depending on which one of the short-range wireless communication unit 14, the QR Code decoder 15, or the IC chip reader 16 obtains connecting information. In a case where the short-range wireless communication unit 14 obtains connecting information, the short-range wireless communication unit 14 sends log-in information. In a case where either one of the QR Code decoder 15 or the IC chip reader 16 obtains connecting information, the network communication unit 13 of the smart device 10 sends log-in information, as the QR Code decoder 15 and the IC chip reader 16 do not have sending functions.

The job controller 20 consists of the CPU 101, etc., as illustrated in FIG. 3, and entirely controls execution of print jobs. That is to say, the job controller 20 starts a sequence to process a print job responding to a user operation entered through the operational input accepting unit 12 of the smart device 10, and then displays job statuses, and job results on the display unit 108.

The record/read unit 21 consists of the SSD 106, the ROM 107, the RAM 102, etc., as illustrated in FIG. 3, and performs processing for recording various kinds of data on the recording unit 1000 and for reading out the various kinds of data recorded in the recording unit 1000.

Action Sequence

Comparative Example

Figure 6:
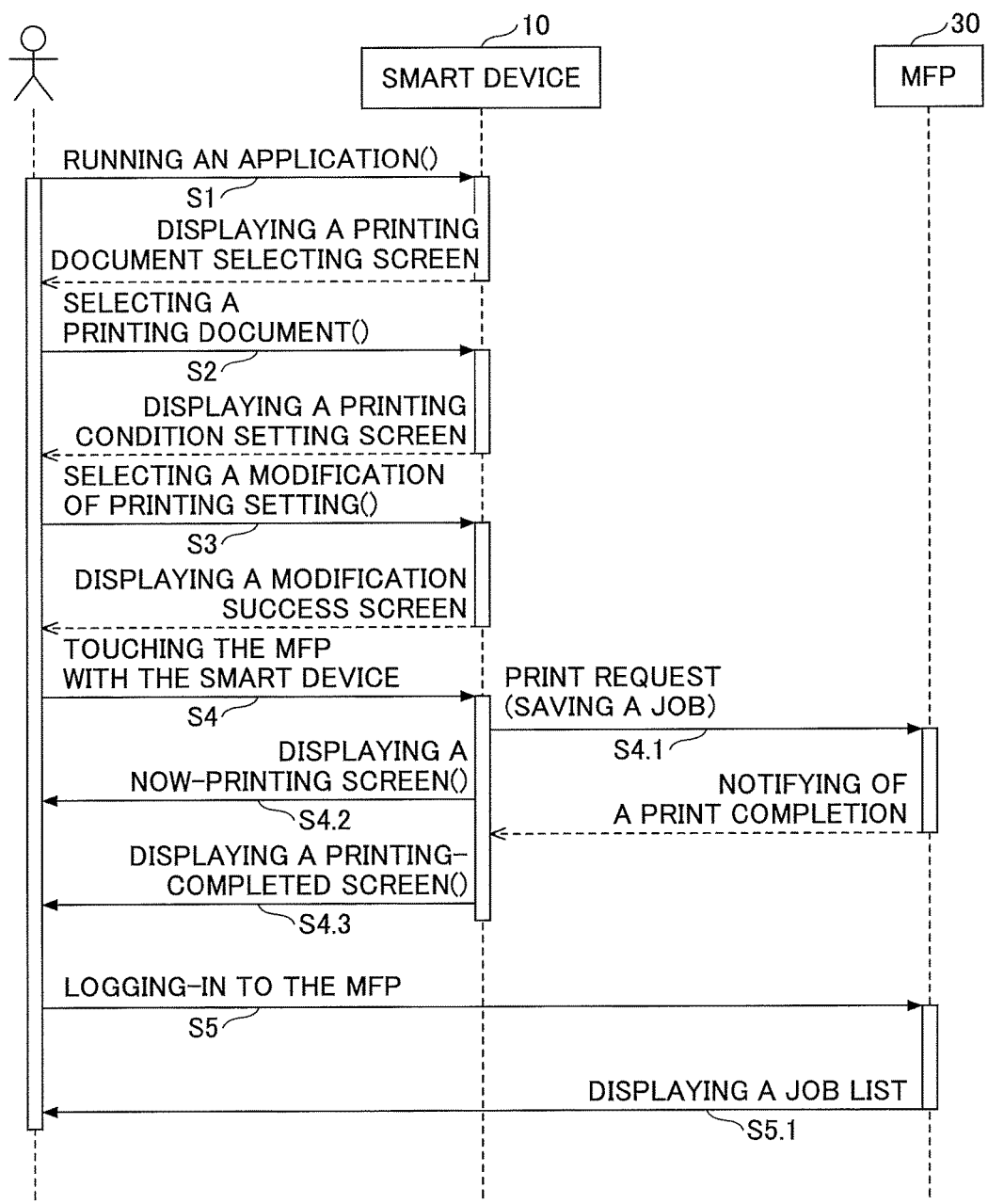
FIG. 6 is a sequence diagram illustrating an example of a printing action through the smart device, according to the embodiment of the present invention (comparative example)

FIG. 6 is a sequence diagram illustrating an example of a printing action through the smart device 10, according to the first embodiment of the present invention. FIG. 6 is a comparative example to further explain the first embodiment described hereinafter.

S1: a user runs an application in order to operate the MFP 30 through the smart device 10 for printing. The UI generator 11 of the smart device 10 displays on the display unit 108 a printing document selecting screen on which document data stored in the smart device 10 is shown on a list. Here the document data may be stored on a network.

S2: after the user selects a printing document from the documents displayed on the printing document selecting screen, the UI generator 11 of the smart device 10 displays a printing condition setting screen on the display unit 108.

S3: the user enters printing settings such as monochrome/color, double-sided/single-sided, aggregate print, etc., so as to instruct the application for a modification of the printing settings. Then, the UI generator 11 of the smart device 10 displays a modification success screen on the display unit 108.

S4: when the user touches the NFC chip 313 with the NFC communication unit 110 of the smart device 10, the IC chip reader 16 reads connecting information. Although the NFC chip 313 is exemplified here, the connecting information may be obtained by the short-range wireless communication unit 14 or the QR Code decoder 15. Here, obtaining the connecting information means sending a printing instruction.

S4.1: as the connecting information is obtained, the network communication unit 13 of the smart device 10 sends a print request, in other words a print job including document data and the printing setting, to the MFP 30. Whether the print job is saved on the MFP 30 or is directly printed is determined by a user setting on the application. In FIG. 6, the application is on a setting where a print job is saved.

S4.2: after sending the print request, the UI generator 11 of the smart device 10 displays a now-printing screen on the display unit 108.

S4.3: after receiving a notification of print completion (or completion of saving the print job in this case), the UI generator 11 of the smart device 10 displays a printing-completed screen on the display unit 108.

Then, the user can go close to the MFP 30 anytime, so as to execute printing of the saved print job.

S5: first, the user directly operates the MFP 30 for log-in. For example, the user enters a user ID and a password through the operating unit 307 of the MFP 30, or uses an IC card, so as to log-in to the MFP 30.

S5.1: when the user is successfully logged-in, the UI generator 31 of the MFP 30 displays on the operating unit 307 a list of the print jobs saved by the user. As the user is close the MFP 30, the user selects a print job from the job list for executing printing, according to the needs.

Here, although in the explanation of FIG. 6 the print job is saved on the MFP 30, the print job may be saved on a print server, etc. Furthermore, although the print job is exemplified as a matter of convenience for explanation, a facsimile job, a scan job, etc., can similarly be processed on such an apparatus that requires a user login.

<Determination of Whether or not to Send Log-in Information>

Figure 7:
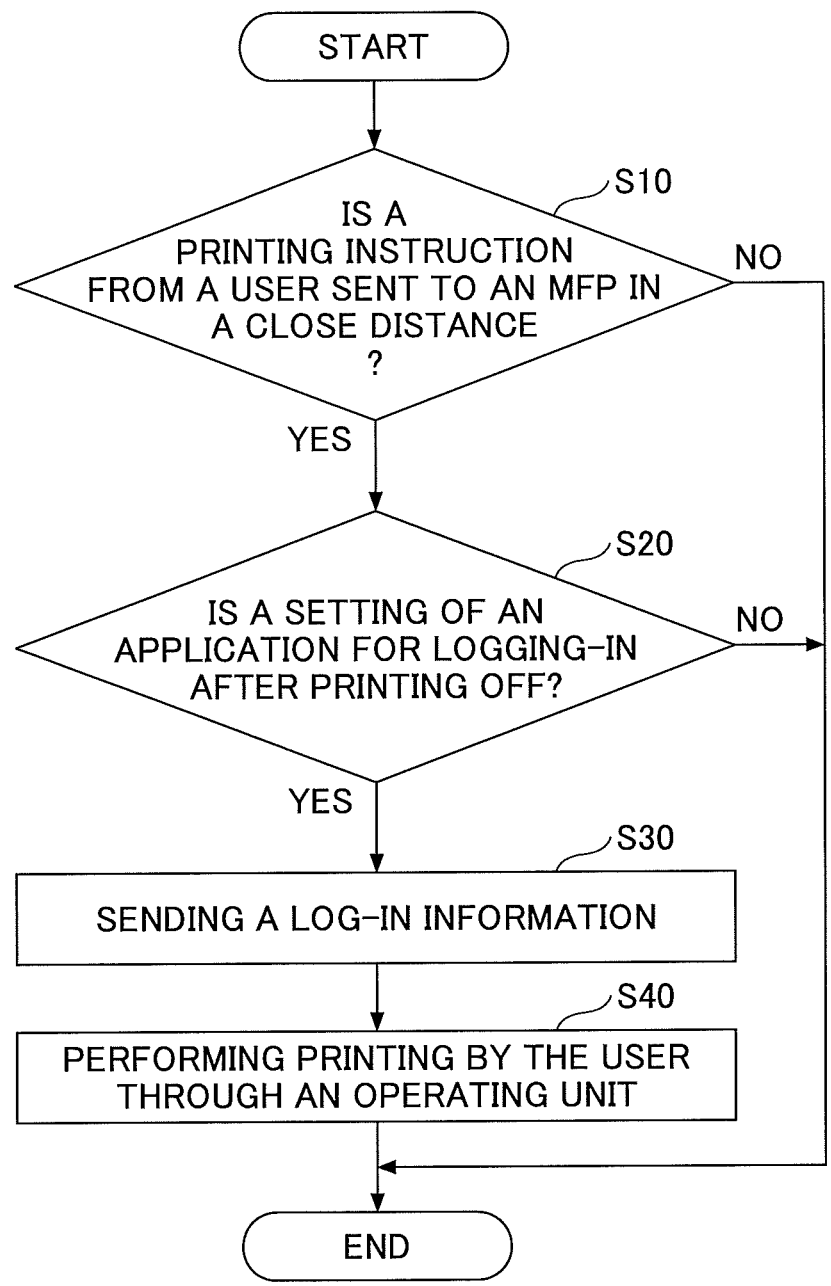
FIG. 7 is a flowchart illustrating an example of a procedure for the smart device to determine whether or not to send a log-in request to the MFP, according to the embodiment of the present invention.

Next, a determination of whether or not the terminal device 10 sends a log-in request will be explained. FIG. 7 is a flowchart illustrating an example of a procedure for the smart device 10 to determine whether or not to send the log-in request to the MFP 30, according to the first embodiment of the present invention. The procedure of FIG. 7 starts when the user sends the printing instruction through the smart device 10.

The close-distance determiner 18 of the smart device 10 determines whether the user sent the printing instruction to the MFP 30 in a close distance (S10 of FIG. 7). The printing instruction is sent by the user to the MFP 30 when the connecting information is obtained. The printing instruction means to send a print job. Moreover, the user can send the printing instruction though a GUI of the smart device 10. In a case where the user is near the MFP 30 at the time of sending the printing instruction, it is hardly considered that another user manipulates the MFP 30 to execute the print job even though the log-in information is sent by the smart device 10 to the MFP 30. Therefore, the close-distance determiner 18 of the smart device 10 determines whether or not the user sent the printing instruction to the MFP 30 in a close distance.

Here, when the connecting information is obtained through either using a short-range wireless communication, decoding a QR Code, or reading the NFC chip 313, it is determined that the printing instruction is sent by the user to the MFP 30 in a close distance. Therefore, when either one of the short-range wireless communication unit 14, the QR Code decoder 15, or the IC chip reader 16 obtains the connecting information, step S10 of FIG. 7 is determined to be YES by the close-distance determiner 18.

In a case where step S10 of FIG. 7 is determined to be NO, the connecting information is considered not to be obtained by the smart device 10, and therefore the smart device 10 cannot send the connecting information to the MFP 30. However, connecting information may be preliminary carried by the smart device 10. In this case, the network communication unit 13 of the smart device 10 can connect to the MFP 30, although the smart device 10 does not send log-in information to the MFP 30 because it is not ensured that the user is near the MFP 30.

In a case where step S10 of FIG. 7 is determined to be YES, the job controller 20 determines whether a setting of the application "logging-in after printing" is off (S20 of FIG. 7). The setting is intended for a case where the user demands not to log-in to the MFP 30 even in a close distance, for example, when the user demands to have the print job saved for printing later. In this case, the smart device 10 sends only the print job to the MFP 30 by use of the connecting information.

In a case where step S20 of FIG. 7 is determined to be NO, the smart device 10 does not send the log-in information to the MFP 30, prioritizing the user setting on the application.

In a case where step S20 of FIG. 7 is determined to be YES, the smart device 10 sends the log-in information to the MFP 30 through a communication method determined by the log-in information sending method determiner 19 as described later (S30 of FIG. 7). In this case, the short-range wireless communication unit 14 or the network communication unit 13 sends the log-in information. The mentioned procedure corresponds to S6 in FIG. 8 and S3 in FIG. 9. As the connecting information identifies the MFP 30 and it is ensured that the user is near the MFP 30, the smart device 10 can send the log-in information to the identified MFP 30 after sending the print job.

Then, the user executes printing through an operation using the operating unit 307 of the MFP 30 (S40 of FIG. 7). Here, the log-in action has already been performed by the smart device 10, the user can select the print job from the job list and execute printing, without performing a log-in operation.

Here, in order to determine whether or not the user is near the MFP 30, the smart device 10 only need at least one of the short-range wireless communication unit 14, the QR Code decoder 15, or the IC chip reader 16.

<<Action Sequence of Sending a Log-in Request from the Smart Device>>

Figure 8:
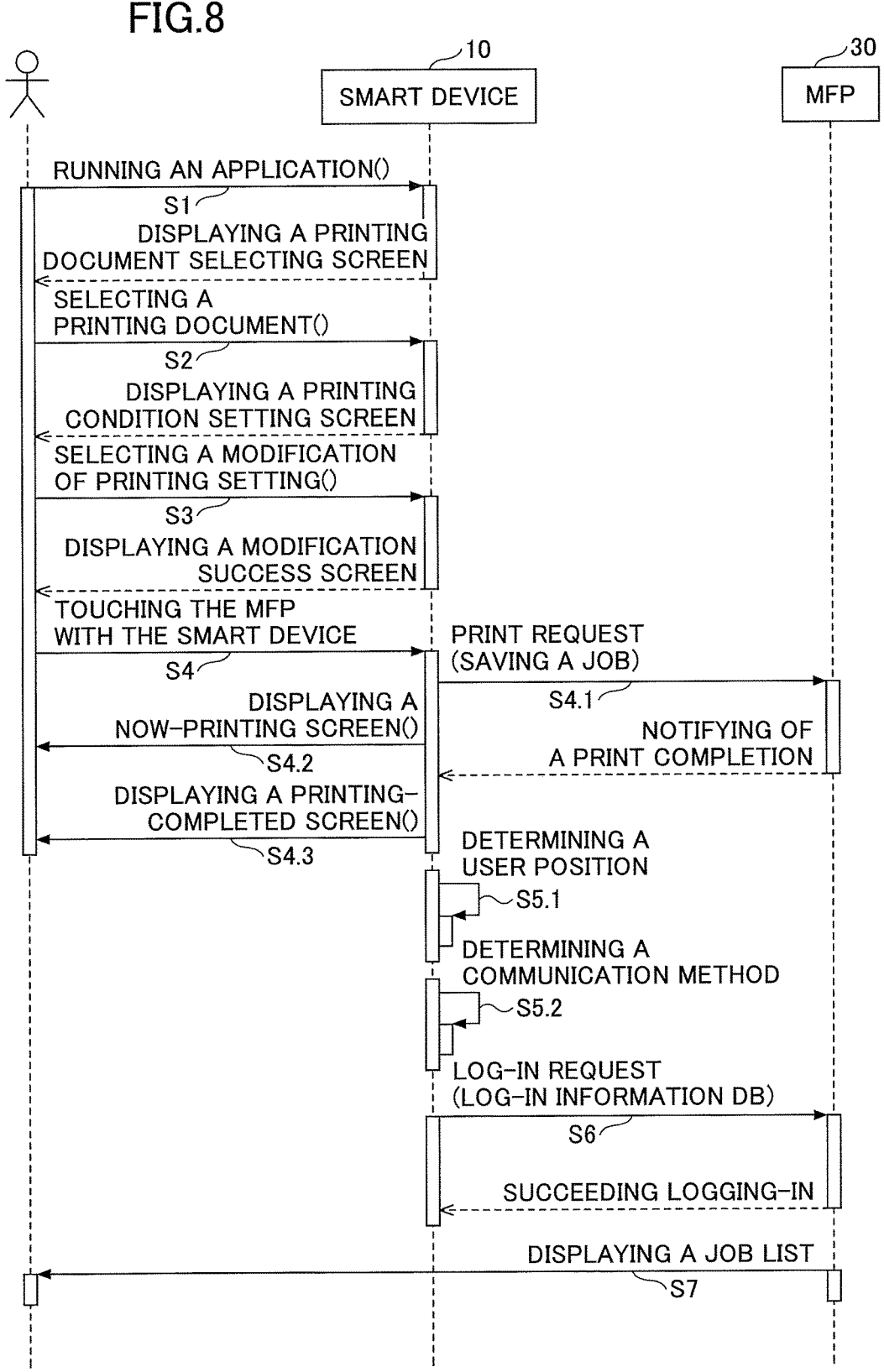
FIG. 8 is a sequence diagram illustrating an example of the printing action through the smart device, according to the embodiment of the present invention.
Figure 9:
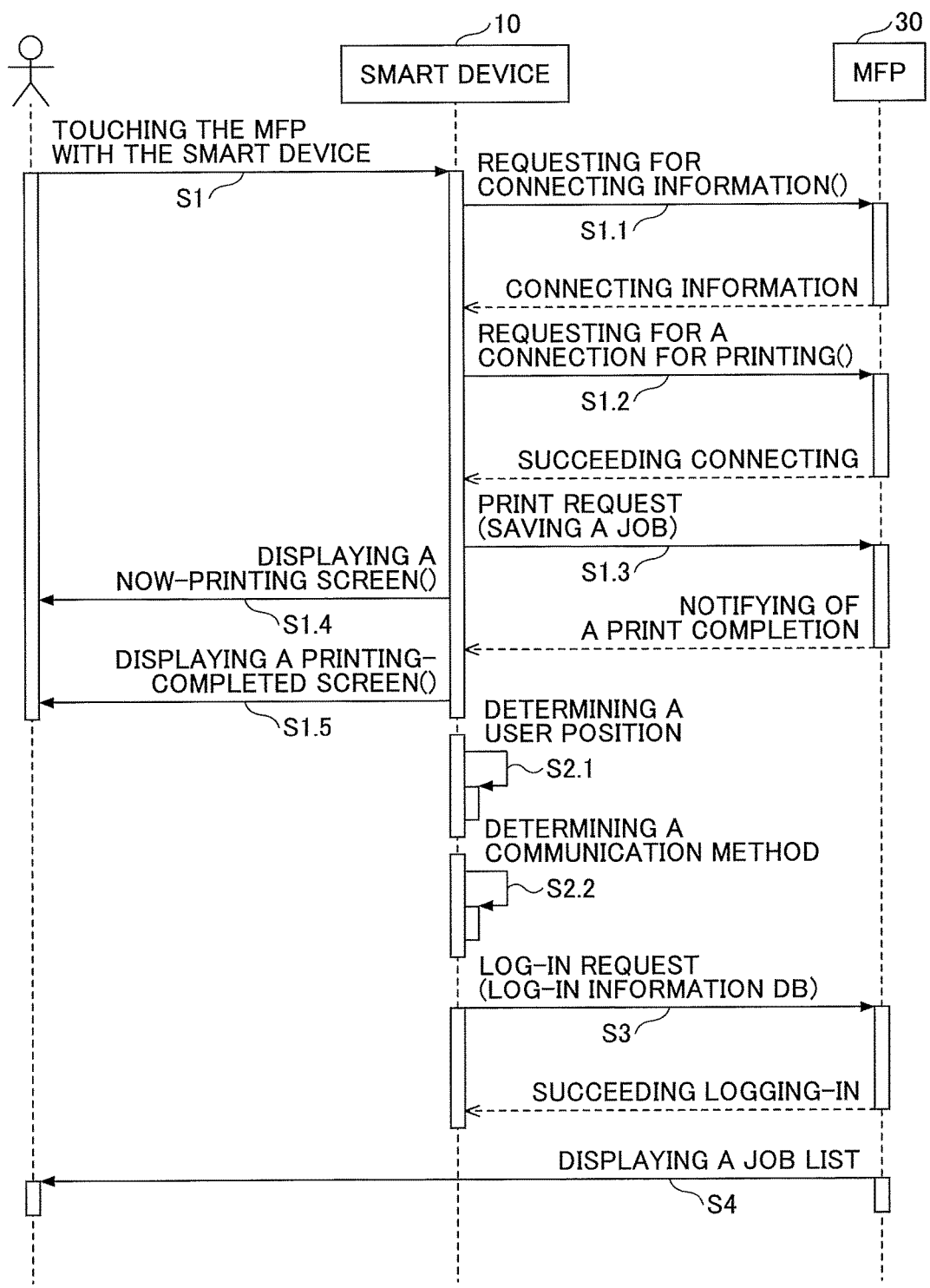
FIG. 9 is a drawing explaining the procedure from step S4.1 through S7 of FIG. 8.

Assuming that the log-in information is determined to be sent from the smart device 10 in the processing of FIG. 7, here is an explanation of the action sequence of the information processing system 300 in the first embodiment, with reference to FIG. 8 and FIG. 9. FIG. 8 is a sequence diagram illustrating an example of the printing action through the smart device 10, according to the first embodiment of the present invention. The processing in steps S1 through S4.3 is the same as in FIG. 6, and therefore the difference with FIG. 6 will be mainly explained here.

S5.1: after the printing-completed screen is displayed, the close-distance determiner 18 determines whether or not the user is near the MFP 30. The process will be explained in FIG. 10.

S5.2: when the user is determined to be near the MFP 30, the log-in information sending method determiner 19 determines the communication method for sending the log-in information. In the sequence of FIG. 8, after detecting that the connecting information is obtained by the IC chip reader 16, the log-in information sending method determiner 19 of the smart device 10 determines to send the log-in information through the network communication unit 13 of the smart device 10. The process will be explained in FIG. 11.

S6: then, the network communication unit 13 of the smart device 10 sends the log-in request to the MFP 30. The log-in request includes the log-in information.

S7: when the user is successfully logged-in, the UI generator 31 of the MFP 30 displays the job list of the user on the operating unit 307.

As described, in the first embodiment, the smart device 10 performs the log-in request when the user is determined to be near the MFP 30, so that the user need not perform a log-in operation at the time of operating the MFP 30.

Although including log-in information in a print job is conventionally possible, it has been difficult for the MFP 30 to determine whether the print job is sent from the smart device 10 or from a PC. Allowing that the determination is possible, the MFP 30 cannot determine whether or not the user is near the MFP 30. In the first embodiment, the log-in information is sent after the user is determined whether or not to be near the MFP 30 based on the method for obtaining the connecting information.

Here, although in FIG. 8 the log-in information is sent from the smart device 10 in step S6 after the print job is sent in step S4.1, the log-in information may be sent along with the print job. As the connecting information is obtained by the smart device 10 in step S4, it is possible that the position of the user is determined prior to step S4.1. In this way, the log-in information need not be sent separately, and therefore the amount of time used for communication is shortened.

FIG. 9 is a drawing explaining the procedure from step S4.1 through S7 of FIG. 8.

S1: the user touches the NFC chip 313 of the MFP 30 with the smart device 10.

S1.1: the IC chip reader 16 of the smart device 10 requests the MFC chip 313 of the MFP 30 to provide the connecting information. As described above, the connecting information may be obtained by the QR Code decoder or the short-range wireless communication unit 14.

Here, in a case where the user knows the connecting information of the MFP 30, a connecting request for printing of step S1.2 may be sent to the MFP 30 without requesting for the connecting information.

S1.2: the network communication unit 13 of the smart device 10 sends the connecting request for printing to the MFP 30 by use of the connecting information.

S1.3: when the connecting is successfully done, the network communication unit 13 of the smart device 10 sends the print request (or the print job) to the MFP 30.

S1.4: after sending the print request, the UI generator 11 of the smart device 10 displays a now-printing screen on the display unit 108.

S1.5: after receiving a notification of print completion (or completion of saving the print job in this case), the UI generator 11 of the smart device 10 displays the printing-completed screen on the display unit 108.

S2.1 through S4: The following processing is the same as steps S5.1 through S6 of FIG. 8, that is, in the case where the close-distance determiner 18 of the smart device 10 determines the user is near the MFP 30, the network communication unit 13 sends the log-in request to the MFP 30. As the user is near the MFP 30, the UI generator 31 of the MFP 30 displays the job list on the operating unit 307 when the user is successfully logged-in.

<Determination of Whether or not the User is Near the MFP>

Figure 10:
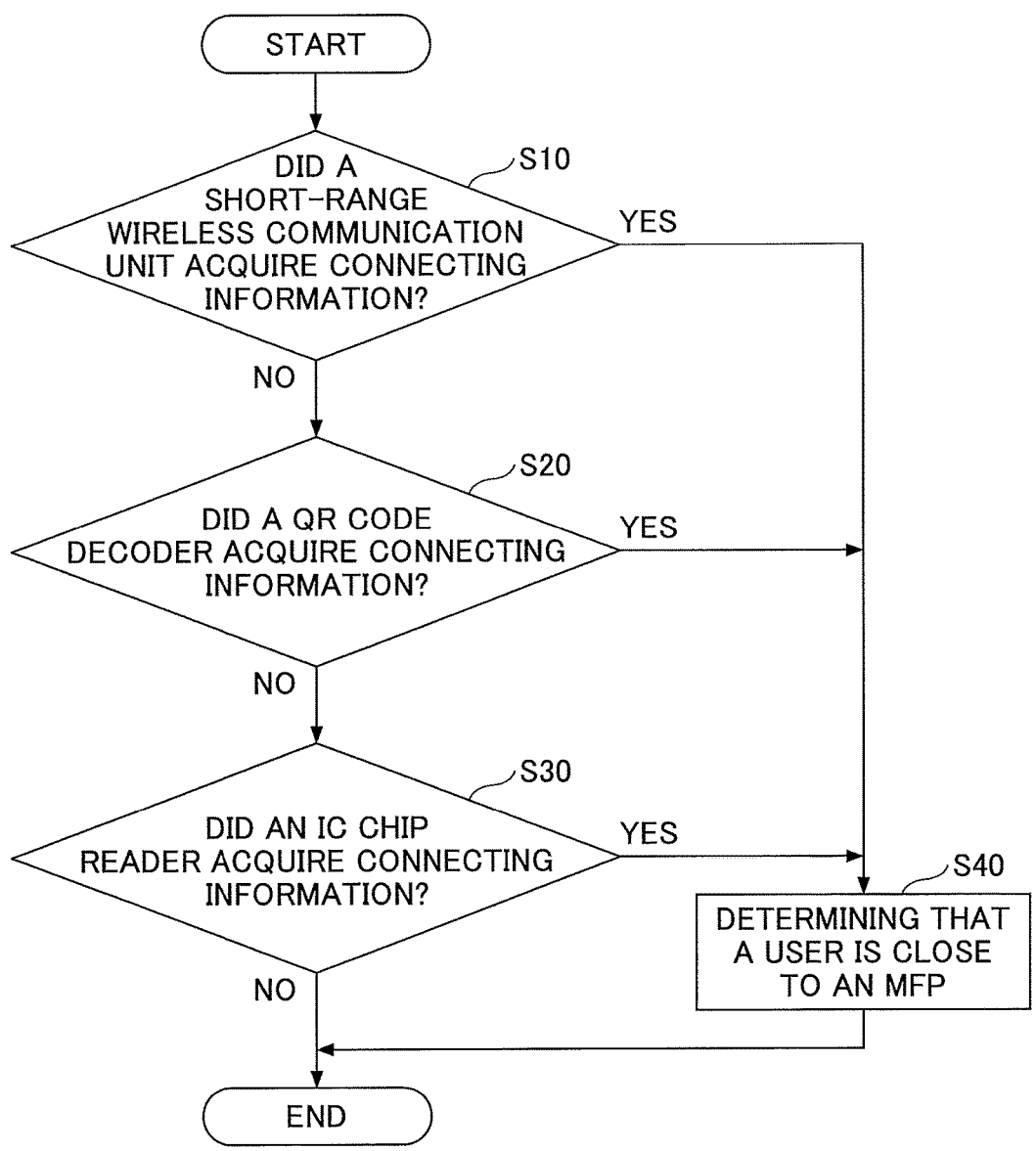
FIG. 10 is a flowchart illustrating an example of a procedure for a close-distance determiner to determine whether or not the user is near the MFP, according to the embodiment of the present invention.

Next, the determination by the close-distance determiner 18 whether or not the user is near the MFP 30 will be explained, with reference to FIG. 10. FIG. 10 is a flowchart illustrating an example of a procedure for the close-distance determiner 18 to determine whether or not the user is near the MFP, according to the first embodiment of the present invention. The procedure of FIG. 10 starts when the connecting information is obtained.

First, the close-distance determiner 18 determines whether the connecting information is obtained by the short-range wireless communication unit 14 (S10 of FIG. 10). Although the communication range of a BLE module is generally within approximately ten meters, if the short-range wireless communication unit 14 receives the connecting information in the mentioned communication range, the determination of whether or not the user is near the MFP 30 becomes more complicating. Hence, for example, the short-range wireless communication unit 14 receives the connecting information only when the radio field intensity from the MFP 30 is beyond a threshold value. In this way, the short-range wireless communication unit 14 receives the connecting information only when the user is near the MFP 30.

Alternatively, as described above, the smart device 10 may obtain the connecting information regardless of the strength of radio field intensity. In this case, the close-distance determiner 18 determines whether or not the user is near the MFP 30 based on the radio field intensity. Here, the user can send the print job to the MFP 30 through the smart device 10 by use of the connecting information even when the user is not near the MFP 30, and therefore a wider variation of operation is achieved (although the smart device 10 does not send the log-in information).

Here, the radio field intensity from the BLE module 111 of the MFP 30 can be observed by a person involved in developing the MFP 30 and relevant applications, etc, so as to adjust the threshold value of step S10. That is to say, the radio field intensity received by the BLE module 111 of the smart device 10 is observed in a situation where the user carrying the smart device 10 is in a position that is considered to be close the MFP 30, and then the observed radio field intensity value or a slightly smaller value of the observed radio field intensity value is set to be the threshold value.

In this way, as the threshold value is properly set, it can be determined that the user is near the MFP 30 when the connecting information is obtained by the short-range wireless communication unit 14.

Further, the information that the short-range wireless communication unit 14 receives from the MFP 30 need not be the connecting information. That is to say, for example, a connection response (or an acknowledgement) or functional information of the MFP 30 may work, as long as received when the radio field intensity is beyond the threshold value. However, in the situation where the user is determined to be close to the MFP 30 when the connecting information is obtained, obtaining information needed for the network communication unit 13 doubles as determining that that the user is closed to the MFP 30.

In a case where step S10 of FIG. 10 is determined to be NO, the close-distance determiner 18 determines whether the connecting information is obtained by the QR Code decoder 15 (S20 of FIG. 10). As the QR Code decoder 15 takes an image of a QR Code using the camera 105, the distance for decoding the QR Code is limited to the quality of the camera 105, the size of the QR Code, etc. Therefore, it can be determined that the user is near the MFP 30 in a case where the connecting information is obtained by the QR Code decoder 15. Further, the information that the QR Code decoder 15 receives from the MFP 30 is not limited to the connecting information as well.

In a case where step S20 of FIG. 10 is determined to be NO, the close-distance determiner 18 determines whether the connecting information is obtained by the IC chip reader 16 (S30 of FIG. 10). The communication range of an IC chip depends on the designs, such as electromagnetic induction types and a radio wave types. The communication range of a radio wave type may even reach more than ten meters. However, the explanation of the first embodiment will be provided, assuming that the communication range of the IC chip is at most a few decade centimeters. Therefore, it can be determined that the user is near the MFP 30 in a case where the connecting information is obtained by the IC chip reader 16. Further, the information that the IC chip reader 16 receives from the MFP 30 is not limited to the connecting information as well.

In a case where either one of steps S10 through S30 of FIG. 10 is determined to be YES, the close-distance determiner 18 determines that the user is near the MFP 30 (S40 of FIG. 10).

Here, in the case where the connecting information is obtained by the short-range wireless communication unit 14, the user may be determined to be near the MFP 30 based on the temporal change of the radio field intensity. For example, the user may be determined to be near the MFP 30 in a case where the radio field intensity is becoming stronger and the user is estimated to be close to the MFP 30 (or the radio field intensity is estimated to come beyond the threshold value) in a predetermined amount of time, such as in a few seconds. As described, in the case where the user is getting closer to the MFP 30, the user is estimated to be near the MFP 30. That is to say, the connecting information may be obtained even when the radio field intensity does not reach the threshold value.

<<Determination of Communication Method for Sending Log-in Information>>

Figure 11:
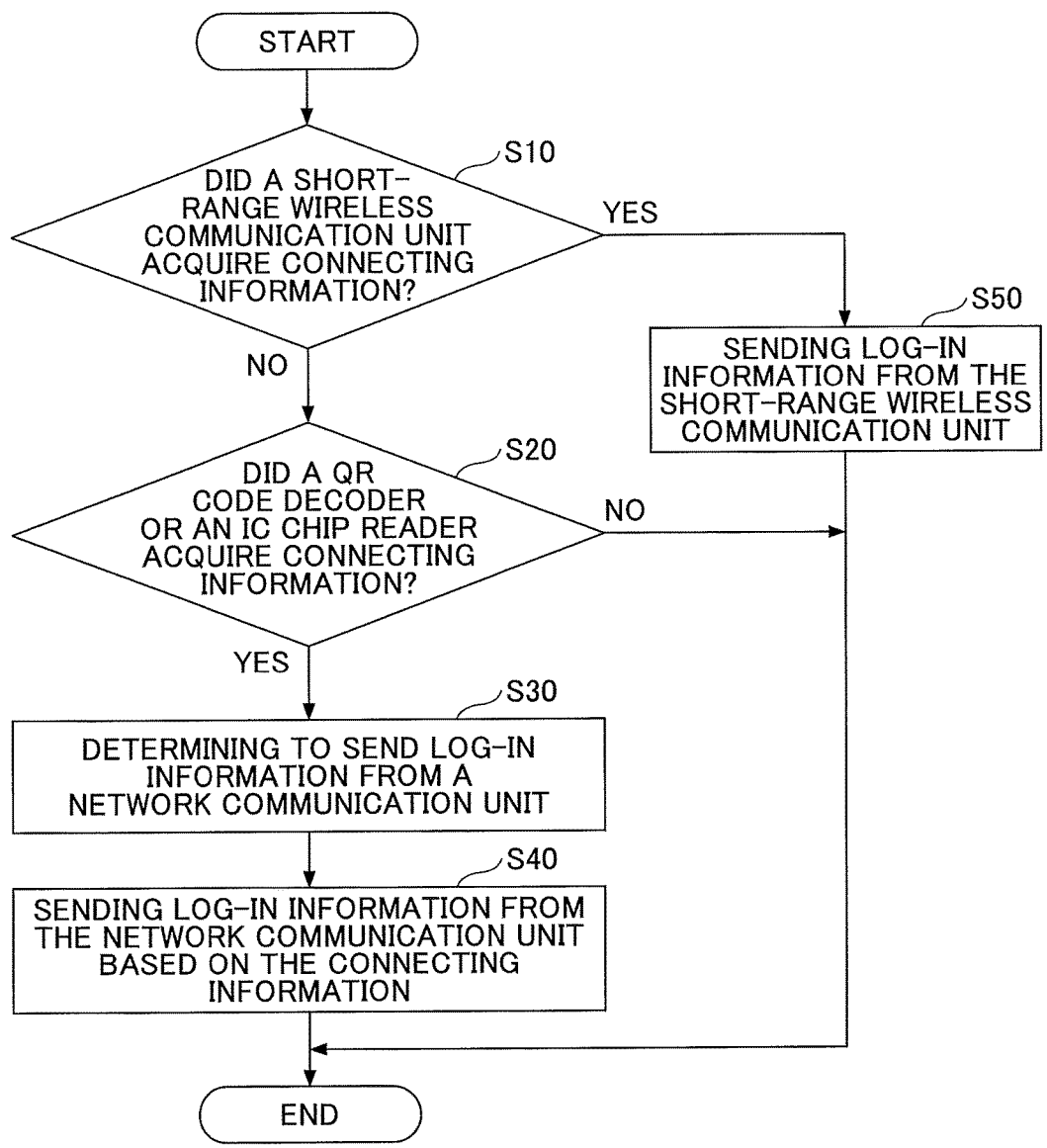
FIG. 11 is a flowchart illustrating an example of a procedure for the smart device to determine a communication method for sending log-in information, according to the embodiment of the present invention.

Next, the determination of communication method for sending the log-in information will be explained, with reference to FIG. 11. FIG. 11 is a flowchart illustrating an example of a procedure for the smart device 10 to determine the communication method for sending the log-in information, according to the first embodiment of the present invention.

The log-in information sending method determiner 19 of the smart device 10 determines whether the connecting information is obtained by the short-range wireless communication unit 14 (S10 of FIG. 11).

In a case where step S10 of FIG. 11 is determined to be YES, the log-in information sending method determiner 19 determines to send the log-in information through the short-range wireless communication unit 14 (S50 of FIG. 11). Here, the short-range wireless communication unit 14, which performs two-way communication with the MFP 30 through BLE, is capable of both receiving the connecting information and sending the log-in information.

In a case where step S10 of FIG. 11 is determined to be NO, the log-in information sending method determiner 19 determines whether the connecting information is obtained by the QR Code decoder 15 or the IC chip reader 16 (S20 of FIG. 11).

In a case where step S20 of FIG. 11 is determined to be NO, the log-in information sending method determiner 19 determines that the user is not near the MFP 30 and determines not to send the log-in information to the MFP 30. In this way, the determination of communication method for sending the log-in information is involved with the determination of whether or not the user is near the MFP 30.

In a case where step S20 of FIG. 11 is determined to be YES, the log-in information sending method determiner 19 determines to send the log-in information through the network communication unit 13 of the smart device 10 (S30 of FIG. 11). This is because the QR Code display unit 34 of the MFP 30 only displays a QR Code and cannot receive the log-in information from the QR Code decoder 15. Similarly, the NFC chip 313 of the MFP 30 only stores the connecting information and cannot receive the log-in information from the IC chip reader 16.

Then, the log-in information is sent from the network communication unit 13 of the smart device 10 to the MFP 30 by use of the connecting information (S40 of FIG. 11). As described above, the communication method for sending the log-in information is properly determined.

According to the sequence in FIG. 8 and FIG. 9, the communication methods are switched twice in the case where the log-in information is sent from the short-range wireless communication unit 14 as described in step S50 of FIG. 11, in such a way as: receiving the connecting information through the short-range wireless communication unit 14 (BLE)→sending the print job through the network communication unit 13 (IP network)→sending the log-in information through the short-range wireless communication unit 14 (BLE). In order to reduce the number of witching communication methods and to achieve a speedier processing, it is effective that the smart device 10 sends the log-in information to the MFP 30 after receiving the connecting information and before sending the print job.

Here, even in the case where the connecting information is obtained by the short-range wireless communication unit 14, the log-in information may be sent from the network communication unit 13 of the smart device 10.

As described above, in the information processing system 300, the log-in information is sent to the MFP 30 from the smart device 10 in the case where the user is near the MFP 30, so that the user need not perform a log-in operation at the time of operating the MFP 30 for executing a print job.

Second Embodiment

In the second embodiment, an information processing system 300 for an MFP 30 to determine whether or not a user is near the MFP 30 will be explained.

Figure 12:
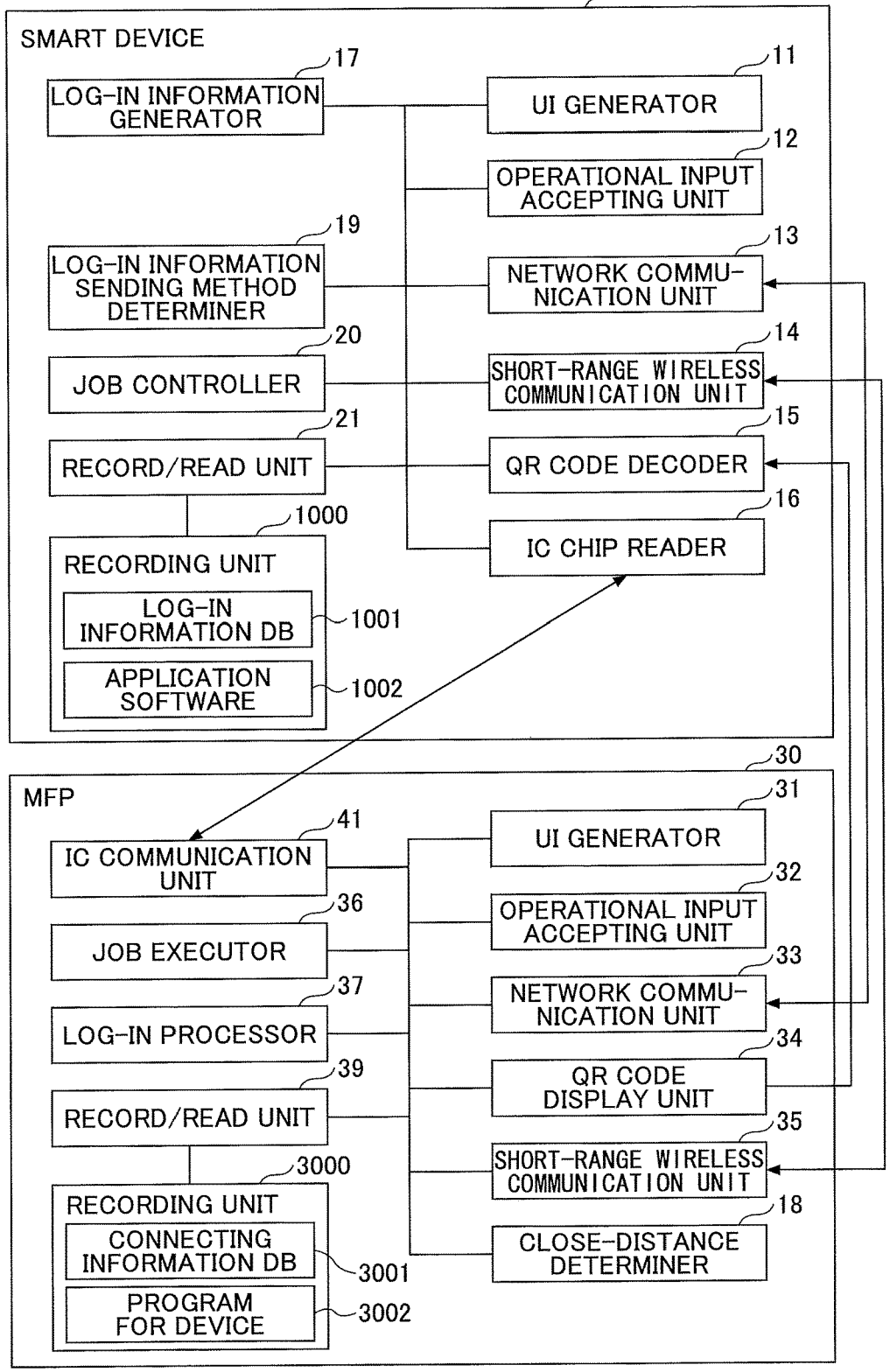
FIG. 12 is a functional block diagram illustrating an example of an information processing system, according to an embodiment of the present invention.

FIG. 12 is a functional block diagram illustrating an example of the information processing system 300, according to the second embodiment of the present invention. In the second embodiment, constructional elements assigned with the same reference signs as in FIG. 5 have the same functions, and therefore only the main constructional elements according to the second embodiment will be explained in the most part of the description.

In the functional block diagram of FIG. 12, the MFP 30 includes the close-distance determiner 18 included in the smart device 10 in the description above. Furthermore, the MFP 30 includes an IC communication unit 41 instead of the connecting information storing unit 38. In the following, the difference from the first embodiment including the close-distance determiner 18 and the IC communication unit 41 will be explained.

The IC communication unit 41 consists of the CPU 301, the NFC chip 313 as illustrated in FIG. 4, and communicates with the IC chip reader 16 included in the smart device 10. In the second embodiment, the NFC chip 313 is connected to the PCI bus 330 in the same hardware configuration of the MFP 30 as illustrated in FIG. 4.

The IC communication unit 41 includes a function as a reader and a writer of a RF tag. Therefore, two-way communication with the IC chip reader 16 becomes possible. The IC communication unit 41 detects that the connecting information stored in the NFC chip 313 is obtained by the IC chip reader 16 of the smart device 10. Here, the IC communication unit 41 does not necessarily include a communication function. The IC communication unit 41 may record on the memory of the NFC chip 313 that the connecting information is read by the IC chip reader 16, so as to be detected by the close-distance determiner 18.

Further, the QR Code display unit 34 of the MFP 30 according to the second embodiment displays on the operating unit 307, for example, a QR Code which includes connecting information and confirming information. The confirming information is information for the close-distance determiner 18 to determine whether or not the QR Code is read. In a case where the QR Code is read by the QR Code decoder 15 of the smart device 10, the network communication unit 13 of the smart device 10 sends the confirming information to the MFP 30. The confirming information included in the QR Code enables the close-distance determiner 18 to determine that the QR Code is read by the smart device 10, that is to say, that the user is near the MFP 30.

Here, as the confirming information, a combination of the number of letters that is considered not to match incidentally will do. Alternatively, the clock time when the QR Code is displayed will do as well. In this case, the close-distance determiner 18 may be arranged to be able to measure the time to pass after the QR Code is displayed and until the confirming information is received from the smart device 10, so that it can be determined that the user is near the MFP 30 not only in a case where the confirming information matches but also in a case where the measured time is within a predetermined length.

As described above, the close-distance determiner 18 consists of the CPU 301, etc., as illustrated in FIG. 4, and determines that the user is near the MFP 30 in either of the cases where the short-range wireless communication unit 35 of the MFP sends the connecting information, where the IC communication unit 41 of the MFP 30 sends the connecting information, or where the network communication unit 33 of the MFP 30 receives the confirming information included in the QR Code displayed by the QR Code display unit 34.

<Action Sequence of Sending a Log-in Request from the Smart Device>

Figure 13:
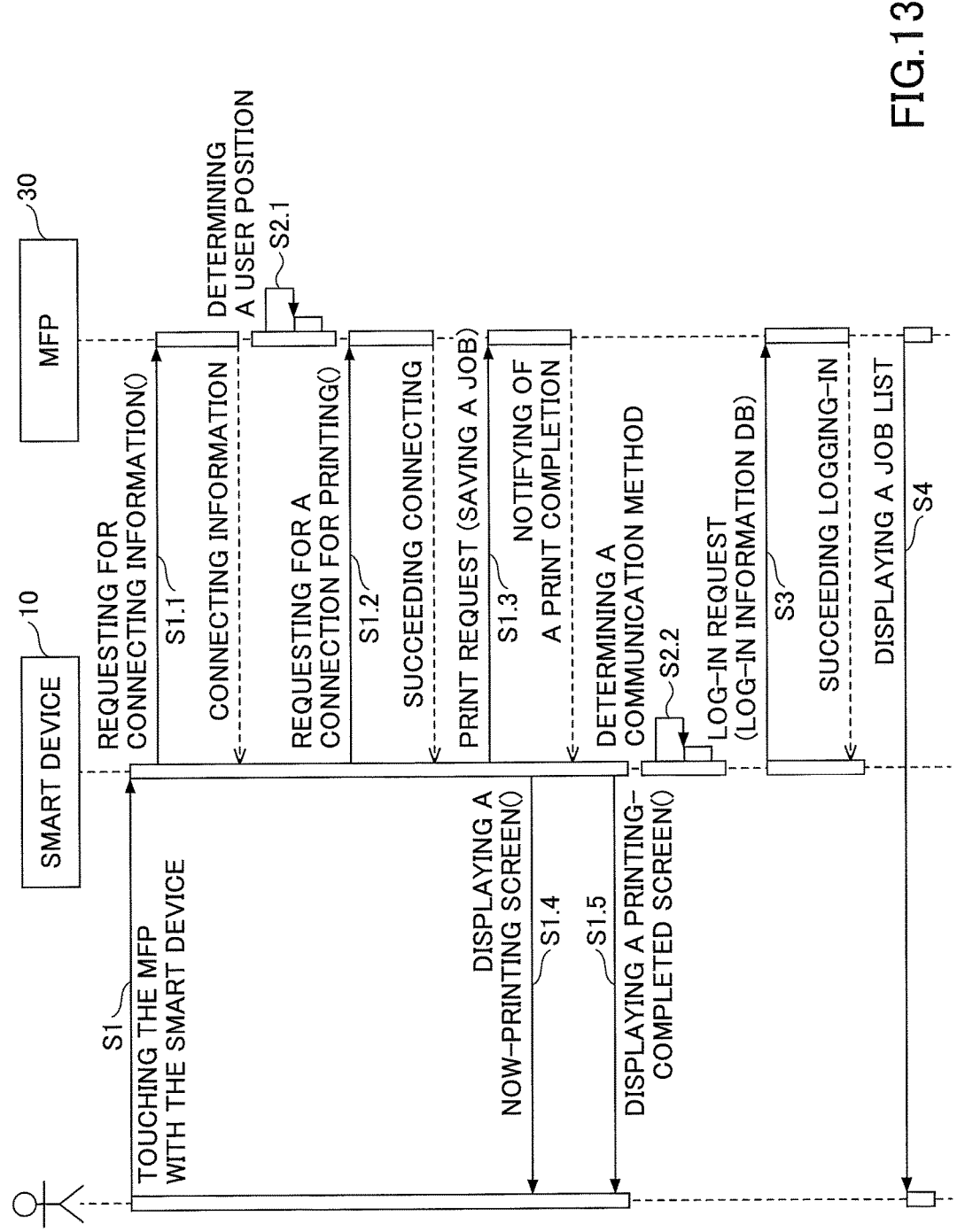
FIG. 13 is a sequence diagram illustrating an example of the printing action through a smart device, according to the embodiment of the present invention.

FIG. 13 is a sequence diagram illustrating an example of the printing action through the smart device 10, according to the second embodiment of the present invention. FIG. 13 illustrates a sequence that corresponds to FIG. 9 in the first embodiment, and therefore the difference with FIG. 9 will be mainly explained here.

S2.1: the close-distance determiner 18 determines whether or not the user is near the MFP 30 when the connecting information is sent from the MFP to the smart device 10. That is to say, a determination of whether or not the user is near the MFP 30 is made by the MFP 30. Here, the timing of the determination may be any time after the connecting information is obtained by the smart device 10. The determining procedure will be explained in FIG. 14.

In the second embodiment, the determination of whether or not the user is near the MFP 30 is not made by the smart device 10. However, the determination of a communication method for sending the log-in information, which is made by the smart device 10, is involved with the determination of whether or not the user is near the MFP 30. In other words, the user can log-in to the MFP 30 through the smart device 10 only in a case where both of the MFP 30 and the smart device 10 determine that the user is near the MFP 30. Therefore, in the second embodiment, it is more precisely determined whether or not the user is near the MFP 30.

<Determination of Whether or not the User is Near the MFP>

Figure 14:
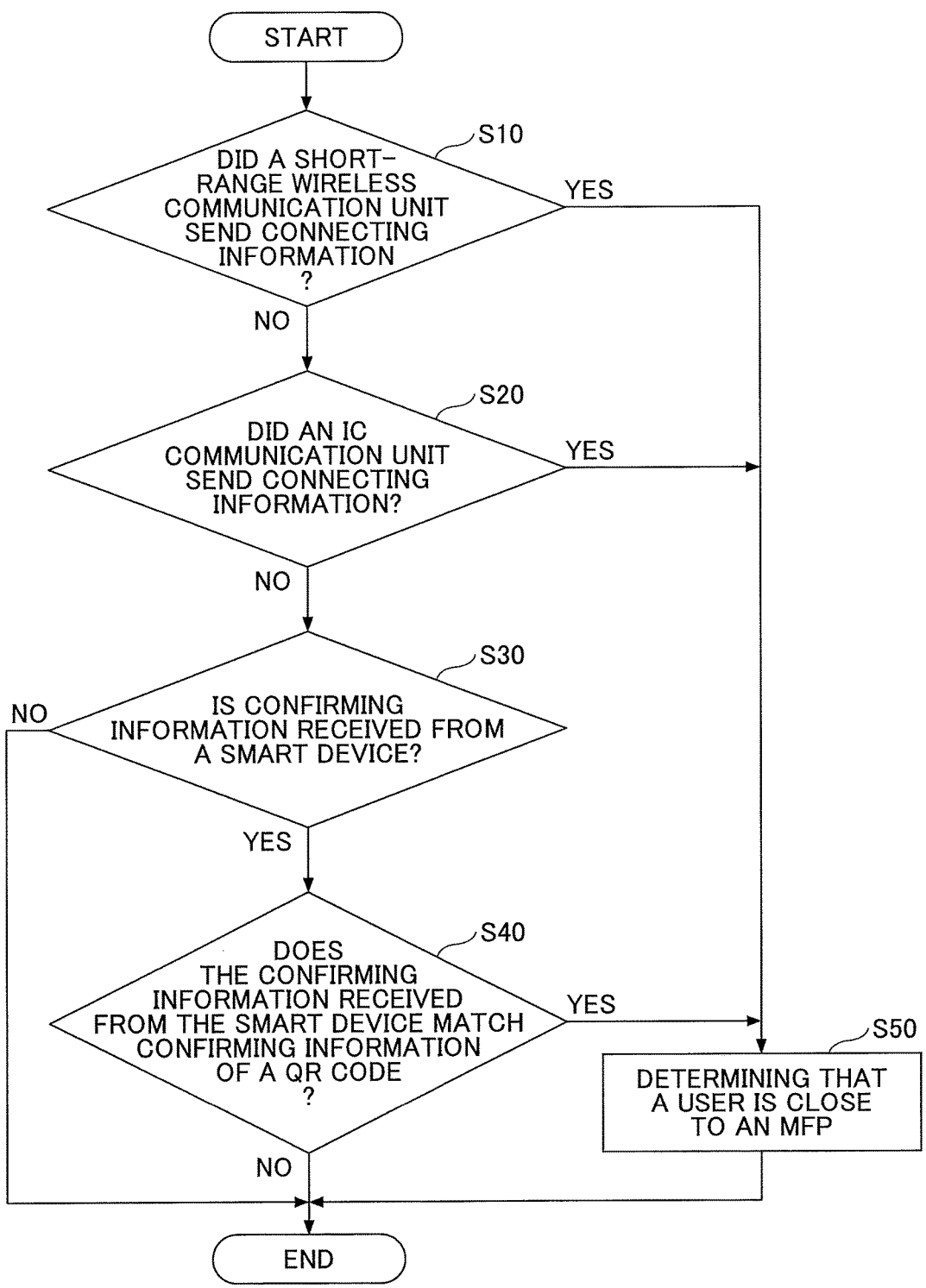
FIG. 14 is a flowchart illustrating an example of a procedure for a close-distance determiner of the MFP to determine whether or not the user is near the MFP, according to the embodiment of the present invention.

FIG. 14 is a flowchart illustrating an example of a procedure for the close-distance determiner 18 of the MFP 30 to determine whether or not the user is near the MFP 30, according to the second embodiment of the present invention. The process of FIG. 10 corresponds to S2.1 of FIG. 13.

First, the close-distance determiner 18 of the MFP 30 determines whether the connecting information is sent by the short-range wireless communication unit 35 of the MFP 30 (S10 of FIG. 14). In the second embodiment, the short-range wireless communication unit 14 of the smart device 10 receives the connecting information in the case where the radio field intensity from the MFP 30 is beyond the threshold value. Otherwise, the short-range wireless communication unit 35 of the MFP 30 sends the connecting information in the case where the radio field intensity from the smart device 10 is beyond the threshold value. In other words, when the MFP 30 sends the connecting information, the user is considered to be near the MFP 30.

In a case where step S10 of FIG. 14 is determined to be NO, the close-distance determiner 18 of the MFP 30 determines whether the connecting information is sent by the IC communication unit 41 (S20 of FIG. 14). As described above, the communication range of an IC chip is at most a few decade centimeters, centimeters, and therefore, it can be determined that the user is near the MFP 30 in a case where the connecting information is sent by the IC communication unit 41 of the MFP 30.

In a case where step S20 of FIG. 14 is determined to be NO, the close-distance determiner 18 of the MFP 30 determines whether the confirming information is received from the smart device 10 (S30 of FIG. 14). As the network communication unit 13 of the smart device 10 sends the confirming information to the MFP 30 by use of the connecting information, the close-distance determiner 18 of the MFP 30 determines whether or not the confirming information is received.

In a case where step S30 of FIG. 14 is determined to be YES, the close-distance determiner of the MFP 30 determines whether the confirming information received from the smart device 10 matches the confirming information included in the QR Code (S40 of FIG. 14).

In a case where either one of steps S10, S20, or S40 of FIG. 14 is determined to be YES, the close-distance determiner 18 of the MFP 30 determines that the user is near the MFP 30 (S50 of FIG. 14).

In this way, in the second embodiment, the MFP 30 can determine whether or not the user is near the MFP 30.

<Determination of Communication Method for Sending Log-in Information>

FIG. 15 is a flowchart illustrating an example of a procedure for the smart device 10 to determine the communication method for sending the log-in information, according to the second embodiment of the present invention. The process of FIG. 15 is performed, for example, in S2.2 of FIG. 13.

The log-in information sending method determiner 19 of the smart device 10 determines whether the connecting information is obtained by the short-range wireless communication unit 14 (S10 of FIG. 15).

In a case where step S10 of FIG. 15 is determined to be YES, the log-in information sending method determiner 19 determines to send the log-in information through the short-range wireless communication unit 14 (S70). Here, the short-range wireless communication unit 14, which performs two-way communication with the MFP 30 through BLE, is capable of both receiving the connecting information and sending the log-in information.

In a case where step S10 of FIG. 15 is determined to be NO, the log-in information sending method determiner 19 determines whether the connecting information is obtained by the IC chip reader 16 (S20 of FIG. 15).

In a case where step S20 of FIG. 15 is determined to be YES, the log-in information sending method determiner 19 determines to send the log-in information through the IC chip reader 16 (S60). Here, the IC chip reader 16 of the smart device 10 is capable of performing two-way communication with the IC communication unit 41, so as to receive the connecting information and to send the log-in information as well.

In a case where step S20 of FIG. 15 is determined to be NO, the log-in information sending method determiner 19 determines whether the connecting information is obtained by the QR Code decoder 15 (S30 of FIG. 15).

In a case where step S30 of FIG. 15 is determined to be YES, the log-in information sending method determiner 19 determines to send the log-in information through the network communication unit 13 of the smart device 10 (S40 of FIG. 15). This is because the QR Code display unit 34 of the MFP 30 only displays a QR Code and cannot receive the log-in information from the QR Code decoder 15.

Then, the log-in information is sent from the network communication unit 13 of the smart device 10 by use of the connecting information (S50 of FIG. 15). As described above, the communication method for sending the log-in information is properly determined.

In a case where step S30 of FIG. 15 is determined to be NO, the log-in information sending method determiner 19 determines not to send the log-in information to the MFP 30 through any of the three communication methods, as the user is not near the MFP 30.

Here, the determination of whether or not the user is near the MFP 30 is made by the MFP 30 in the second embodiment. Therefore, the network communication unit 13 or the IC chip reader 16 of the smart device 10 may send the log-in information along with the print job, without performing such determination processes as illustrated in FIG. 15. In this case, the log-in processor 37 of the MFP 30 authorizes a user log-in only in a case where the user is determined to be close to the MFP 30.

As described above, in the information processing system 300 or the information processing method performed by the information processing system 300, the MFP 30 determines whether or not the user is near the MFP 30, so that the user need not perform the log-in operation at the time of operating the MFP 30 for executing the print job.

Other Embodiments

Further, the present invention is not limited to these embodiments, but various variations and modifications may be made without departing from the scope of the present invention.

Although, in the explanation of the above embodiments, an execution of a print job is exemplified, the present invention is applicable to situations where each kind of apparatuses receives log-in information from the smart device 10. That is to say, the user need not perform a log-in operation at the time of operating an apparatus which requires a user log-in in order to be operated through the smart device 10. For example, apparatuses having communication functions with other apparatuses, such as an electronic blackboard and a teleconferencing device, displays data sent from the user through the smart device 10 or transfers such data to other apparatuses. Here, when a person other than the user can communicate with such apparatuses, the security is considered to be decreased. Further, apparatuses which require user log-in do not necessarily deal with data of the user, that is to say, apparatuses which require user log-in for general operations are included as well. For example, with regard to a PC and a game machine, a user log-in may be required so as not to be used by a person who pretends to be the user.

Further, in the above embodiments, although the user has the print job saved on the MFP 30, the MFP 30 may perform the received print job without saving the print job.

Further, the constructional elements of FIG. 5, etc., are segmented based on main functions, in order to help understanding the processes of the smart device 10 and the MFP 30. The present invention is not limited to the way that the constructional elements are segmented or the way that the constructional elements are named. Further, the processing in the smart device 10 and the MFP 30 may be segmented into smaller or bigger processing units depending on processed objects.

Further, the log-in information DB 1001 included in the smart device 10 and the connecting information DB 3001 included in the MFP 30 may be stored on the network N.

Further, the close-distance determiner 18 is an example of a determining unit. The network communication unit 13 is an example of a first wireless connection unit. The network communication unit 13 and the short-range wireless communication unit 14 are examples of an authorization information sending unit, respectively. The log-in processor 37 is an example of an authorization unit. The log-in information sending method determiner 19 is an example of a communication method determining unit.

As described above, the convenience of devices which can be operated through a smart device is enhanced.

What is claimed is:

1. A first information processing apparatus comprising:
a processor; and
a memory device configured to store a program, wherein the processor, upon executing the program, is configured to perform:
determining, in response to a request for print data, whether or not the first information processing apparatus is within a threshold distance of a device including a printing function based upon whether a process is performed in a determined method; and
sending the print data and sending authorization information requesting an authorization for an operation to the device including a printing function, in response to determining that the first information processing apparatus is within the threshold distance of the device including a printing function, and sending print data and not sending the authorization information in response to determining that the first information processing apparatus is not within the threshold distance of the device including a printing function.

2. The first information processing apparatus of claim 1, wherein the determining, by the processor upon executing the program, includes:
acquiring one of a plurality of types of first information from the device including a printing function; and
determining that the first information processing apparatus is within the threshold distance from the device including a printing function, based upon the one of a plurality of types of first information acquired.

3. The first information processing apparatus of claim 2, wherein the processor, upon executing the program, is further configured to perform
wirelessly connecting to the device including a printing function, and
wherein the one of a plurality of types of first information is connecting information for connecting to the device including a printing function.

4. The first information processing apparatus of claim 3, wherein the processor, upon executing the program, is further configured to perform:
sending a second information to the device including a printing function; and
wirelessly sending the authorization information to the device including a printing function before sending the second information to the device including a printing function, in response to wirelessly acquiring the one of a plurality of types of first information from the device including a printing function.

5. The first information processing apparatus of claim 3, wherein the processor, upon executing the program, is further configured to perform:
sending a second information to the device including a printing function; and
sending the authorization information along with the second information to the device including a printing function, in response to determining that the first information processing apparatus is within the threshold distance of the device including a printing function.

6. The first information processing apparatus of claim 2, wherein the processor, upon executing the program, is further configured to perform:
communicating through radio waves with the device including a printing function; and
wherein the determining, by the processor upon executing the program, includes determining whether or not an intensity of radio waves received from the device including a printing function is greater than a threshold value, the one of a plurality of types of first information being acquired in response to determining that the intensity of the radio waves is greater than the threshold value.

7. The first information processing apparatus of claim 6, wherein, upon executing the program, the processor is further configured to perform determining, in response to a type of method used to acquire the one of a plurality of types of first information from the device including a printing function, a communication method for sending the authorization information.

8. The first information processing apparatus of claim 2, wherein the processor, upon executing the program, is further configured to perform:
capturing an image; and
decoding image data, generated by the capturing of an image displayed on the device including a printing function, so as to acquire the one of a plurality of types of first information.

9. The first information processing apparatus of claim 2, wherein the acquiring, by the processor upon executing the program, includes acquiring the one of a plurality of types of first information wirelessly from a recording medium provided on the device including a printing function.

10. The first information processing apparatus of claim 2, wherein the determining, by the processor upon executing the program, includes:
determining that the first information processing apparatus is within the threshold distance based upon whether or not the method of acquiring the first information is a determined communication method.

11. The first information processing apparatus of claim 1, wherein the sending, by the processor upon executing the program, includes sending both a processing request and authorization information requesting an authorization for an operation to the device including a printing function.

12. A method for processing information performed by a first information processing apparatus, the method comprising:
determining whether or not the first information processing apparatus is within a threshold distance of a device including a printing function, in response to a request for print data, based upon whether a process is performed in a determined method;
sending authorization information, requesting an authorization for an operation, to the device including a printing function, in response to determining that the first information processing apparatus is within the threshold distance of the device including a printing function; and
sending print data and not sending the authorization information in response to determining that the first information processing apparatus is not within the threshold distance of the device including a printing function.

13. The method of claim 12, wherein the sending includes sending both a processing request and authorization information requesting an authorization for an operation to the device including a printing function, in response to determining that the first information processing apparatus is within the threshold distance of the device including a printing function.

14. The first information processing method of claim 12, wherein the determining includes:
acquiring one of a plurality of types of first information from the device including a printing function; and
determining that the first information processing apparatus is within the threshold distance from the device including a printing function, based upon the acquired one of a plurality of types of first information acquired.

15. The first information processing method of claim 14, further comprising:
communicating through radio waves with the device including a printing function; and
wherein the determining includes determining whether or not an intensity of radio waves received from the device including a printing function is greater than a threshold value, the one of a plurality of types of first information being acquired in response to determining that the intensity of the radio waves is greater than the threshold value.

16. The first information processing method of claim 14, wherein the determining includes:
determining that the one of a plurality of types of first information processing apparatus is within the threshold distance based upon whether or not the method of acquiring the one of a plurality of types of first information is a determined communication method.

17. An information processing system including a first information processing apparatus and a device including a printing function, the information processing system comprising:
one or more processors;
one or more memory devices configured to store one or more programs, wherein the one or more processors, upon executing the one or more programs, is configured to perform:
determining whether or not the first information processing apparatus is within a threshold distance of the device including a printing function, in response to a request for print data, based upon whether a process is performed in a determined method;
acquiring authorization information, requesting an authorization for an operation, in response to determining that the first information processing apparatus is within the threshold distance of the device including a printing function;
authorizing the operation based on the authorization information; and
sending print data and not acquiring the authorization information, in response to determining that the first information processing apparatus is not within the threshold distance of the device including a printing function.

18. The information processing system of claim 17, wherein the sending, by the processor upon executing the program, includes sending both a processing request and authorization information requesting an authorization for an operation to the device including a printing function, in response to determining that the first information processing apparatus is within the threshold distance of the device including a printing function.

19. The first information processing system of claim 17, wherein the one or more processors, upon executing the one or more programs, is further configured to perform:
 acquiring one of a plurality of types of first information from the device including a printing function; and
 determining that the first information processing apparatus is within the threshold distance from the device including a printing function, based upon the acquired one of a plurality of types of first information acquired.

20. The first information processing method of claim 19, wherein the one or more processors, upon executing the one or more programs, is further configured to perform:
 communicating through radio waves with the device including a printing function, wherein the determining includes determining whether or not an intensity of radio waves received from the device including a printing function is greater than a threshold value, the one of a plurality of types of first information being acquired in response to determining that the intensity of the radio waves is greater than the threshold value.

* * * * *